US008823688B2

(12) United States Patent
Ichimasa

(10) Patent No.: US 8,823,688 B2
(45) Date of Patent: Sep. 2, 2014

(54) DISPLAY CONTROL APPARATUS AND METHOD OF CONTROLLING THE DISPLAY CONTROL DEVICE

(75) Inventor: Shoji Ichimasa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 939 days.

(21) Appl. No.: 12/961,110

(22) Filed: Dec. 6, 2010

(65) Prior Publication Data

US 2011/0141080 A1 Jun. 16, 2011

(30) Foreign Application Priority Data

Dec. 15, 2009 (JP) ................................ 2009-284546

(51) Int. Cl.

| | |
|---|---|
| ***G06F 3/038*** | (2013.01) |
| ***G09G 5/00*** | (2006.01) |
| ***G09G 3/36*** | (2006.01) |

(52) U.S. Cl.

CPC .......... *G09G 3/3688* (2013.01); *G09G 2310/08* (2013.01); *G09G 2310/027* (2013.01); *G09G 2340/0435* (2013.01)

USPC ................. 345/204; 345/76; 345/82; 345/84; 345/690

(58) Field of Classification Search

CPC .................... G09G 3/3688; G09G 2340/0435; G09G 2310/08; G09G 2310/027

USPC .................... 345/76–111, 204–215, 690–699

See application file for complete search history.

(56) References Cited

U.S. PATENT DOCUMENTS

| | | | | |
|---|---|---|---|---|
| 6,943,765 | B2 | 9/2005 | Aoki | |
| 7,598,969 | B2 | 10/2009 | Aoki | |
| 8,564,522 | B2 * | 10/2013 | Kim | 345/99 |

FOREIGN PATENT DOCUMENTS

| | | |
|---|---|---|
| JP | 2003-099016 | 4/2003 |

* cited by examiner

*Primary Examiner* — Michael Pervan

(74) *Attorney, Agent, or Firm* — Cowan, Liebowitz & Latman, P.C.

(57) ABSTRACT

A display control apparatus to drive a display panel to display an image and a control method of the display device. It is determined whether or not a number of different bits in a plurality of bits of display image signals that are to be continuously converted into analog signals are different from each other is equal to or more than a predetermined value. If it is determined that the number of different bits is equal to or more than the predetermined value, then the display image signal is modified so that the display panel is driven based on an analog signal converted from the modified display signal to display an image.

11 Claims, 18 Drawing Sheets

FIG. 8

| | HCLK | DAC | DATA | DATA | BINARY DATA | | | | | | | | | | | | DIFFERENTIAL COMPARISON (n−8) | | | | | | | | | | | | DIFFERENTIAL CALCULATION |
|---|---|---|---|---|---|---|---|---|---|---|---|---|---|---|---|---|---|---|---|---|---|---|---|---|---|---|---|---|---|
| | HCLK | ch | DEC | HEX | 11 | 10 | 9 | 8 | 7 | 6 | 5 | 4 | 3 | 2 | 1 | 0 | 11 | 10 | 9 | 8 | 7 | 6 | 5 | 4 | 3 | 2 | 1 | 0 | |
| | 1 | 0 | 0 | 000 | 0 | 0 | 0 | 0 | 0 | 0 | 0 | 0 | 0 | 0 | 0 | 0 | | | | | | | | | | | | | |
| | 1 | 1 | 4 | 004 | 0 | 0 | 0 | 0 | 0 | 0 | 0 | 0 | 0 | 1 | 0 | 0 | | | | | | | | | | | | | |
| | 1 | 2 | 8 | 008 | 0 | 0 | 0 | 0 | 0 | 0 | 0 | 0 | 1 | 0 | 0 | 0 | | | | | | | | | | | | | |
| | 1 | 3 | 12 | 00C | 0 | 0 | 0 | 0 | 0 | 0 | 0 | 0 | 1 | 1 | 0 | 0 | | | | | | | | | | | | | |
| | 1 | 4 | 16 | 010 | 0 | 0 | 0 | 0 | 0 | 0 | 0 | 1 | 0 | 0 | 0 | 0 | | | | | | | | | | | | | |
| | 1 | 5 | 20 | 014 | 0 | 0 | 0 | 0 | 0 | 0 | 0 | 1 | 0 | 1 | 0 | 0 | | | | | | | | | | | | | |
| | 1 | 6 | 24 | 018 | 0 | 0 | 0 | 0 | 0 | 0 | 0 | 1 | 1 | 0 | 0 | 0 | | | | | | | | | | | | | |
| | 1 | 7 | 28 | 01C | 0 | 0 | 0 | 0 | 0 | 0 | 0 | 1 | 1 | 1 | 0 | 0 | | | | | | | | | | | | | |
| | | | | | | | | | | | | | | ⋮ | | | | | | | | | | | | | | | |
| 800 | 63 | 0 | 1984 | 7C0 | 0 | 1 | 1 | 1 | 1 | 1 | 0 | 0 | 0 | 0 | 0 | 0 | 0 | 0 | 0 | 0 | 0 | 1 | 1 | 0 | 0 | 0 | 0 | 0 | 2 |
| | 63 | 1 | 1988 | 7C4 | 0 | 1 | 1 | 1 | 1 | 1 | 0 | 0 | 0 | 1 | 0 | 0 | 0 | 0 | 0 | 0 | 0 | 1 | 1 | 0 | 0 | 0 | 0 | 0 | 2 |
| | 63 | 2 | 1992 | 7C8 | 0 | 1 | 1 | 1 | 1 | 1 | 0 | 0 | 1 | 0 | 0 | 0 | 0 | 0 | 0 | 0 | 0 | 1 | 1 | 0 | 0 | 0 | 0 | 0 | 2 |
| | 63 | 3 | 1996 | 7CC | 0 | 1 | 1 | 1 | 1 | 1 | 0 | 0 | 1 | 1 | 0 | 0 | 0 | 0 | 0 | 0 | 0 | 1 | 1 | 0 | 0 | 0 | 0 | 0 | 2 |
| | 63 | 4 | 2000 | 7D0 | 0 | 1 | 1 | 1 | 1 | 1 | 0 | 1 | 0 | 0 | 0 | 0 | 0 | 0 | 0 | 0 | 0 | 1 | 1 | 0 | 0 | 0 | 0 | 0 | 2 |
| | 63 | 5 | 2004 | 7D4 | 0 | 1 | 1 | 1 | 1 | 1 | 0 | 1 | 0 | 1 | 0 | 0 | 0 | 0 | 0 | 0 | 0 | 1 | 1 | 0 | 0 | 0 | 0 | 0 | 2 |
| | 63 | 6 | 2008 | 7D8 | 0 | 1 | 1 | 1 | 1 | 1 | 0 | 1 | 1 | 0 | 0 | 0 | 0 | 0 | 0 | 0 | 0 | 1 | 1 | 0 | 0 | 0 | 0 | 0 | 2 |
| | 63 | 7 | 2012 | 7DC | 0 | 1 | 1 | 1 | 1 | 1 | 0 | 1 | 1 | 1 | 0 | 0 | 0 | 0 | 0 | 0 | 0 | 1 | 1 | 0 | 0 | 0 | 0 | 0 | 2 |
| 801 | 64 | 0 | 2016 | 7E0 | 0 | 1 | 1 | 1 | 1 | 1 | 1 | 0 | 0 | 0 | 0 | 0 | 0 | 0 | 0 | 0 | 0 | 0 | 1 | 0 | 0 | 0 | 0 | 0 | 1 |
| | 64 | 1 | 2020 | 7E4 | 0 | 1 | 1 | 1 | 1 | 1 | 1 | 0 | 0 | 1 | 0 | 0 | 0 | 0 | 0 | 0 | 0 | 0 | 1 | 0 | 0 | 0 | 0 | 0 | 1 |
| | 64 | 2 | 2024 | 7E8 | 0 | 1 | 1 | 1 | 1 | 1 | 1 | 0 | 1 | 0 | 0 | 0 | 0 | 0 | 0 | 0 | 0 | 0 | 1 | 0 | 0 | 0 | 0 | 0 | 1 |
| | 64 | 3 | 2028 | 7EC | 0 | 1 | 1 | 1 | 1 | 1 | 1 | 0 | 1 | 1 | 0 | 0 | 0 | 0 | 0 | 0 | 0 | 0 | 1 | 0 | 0 | 0 | 0 | 0 | 1 |
| | 64 | 4 | 2032 | 7F0 | 0 | 1 | 1 | 1 | 1 | 1 | 1 | 1 | 0 | 0 | 0 | 0 | 0 | 0 | 0 | 0 | 0 | 0 | 1 | 0 | 0 | 0 | 0 | 0 | 1 |
| | 64 | 5 | 2036 | 7F4 | 0 | 1 | 1 | 1 | 1 | 1 | 1 | 1 | 0 | 1 | 0 | 0 | 0 | 0 | 0 | 0 | 0 | 0 | 1 | 0 | 0 | 0 | 0 | 0 | 1 |
| | 64 | 6 | 2040 | 7F8 | 0 | 1 | 1 | 1 | 1 | 1 | 1 | 1 | 1 | 0 | 0 | 0 | 0 | 0 | 0 | 0 | 0 | 0 | 1 | 0 | 0 | 0 | 0 | 0 | 1 |
| | 64 | 7 | 2044 | 7FC | 0 | 1 | 1 | 1 | 1 | 1 | 1 | 1 | 1 | 1 | 0 | 0 | 0 | 0 | 0 | 0 | 0 | 0 | 1 | 0 | 0 | 0 | 0 | 0 | 1 |
| 802 | 65 | 0 | 2048 | 800 | 1 | 0 | 0 | 0 | 0 | 0 | 0 | 0 | 0 | 0 | 0 | 0 | 1 | 1 | 1 | 1 | 1 | 1 | 1 | 0 | 0 | 0 | 0 | 0 | 7 |
| | 65 | 1 | 2052 | 804 | 1 | 0 | 0 | 0 | 0 | 0 | 0 | 0 | 0 | 1 | 0 | 0 | 1 | 1 | 1 | 1 | 1 | 1 | 1 | 0 | 0 | 0 | 0 | 0 | 7 |
| | 65 | 2 | 2056 | 808 | 1 | 0 | 0 | 0 | 0 | 0 | 0 | 0 | 1 | 0 | 0 | 0 | 1 | 1 | 1 | 1 | 1 | 1 | 1 | 0 | 0 | 0 | 0 | 0 | 7 |
| | 65 | 3 | 2060 | 80C | 1 | 0 | 0 | 0 | 0 | 0 | 0 | 0 | 1 | 1 | 0 | 0 | 1 | 1 | 1 | 1 | 1 | 1 | 1 | 0 | 0 | 0 | 0 | 0 | 7 |
| | 65 | 4 | 2064 | 810 | 1 | 0 | 0 | 0 | 0 | 0 | 0 | 1 | 0 | 0 | 0 | 0 | 1 | 1 | 1 | 1 | 1 | 1 | 1 | 0 | 0 | 0 | 0 | 0 | 7 |
| | 65 | 5 | 2068 | 814 | 1 | 0 | 0 | 0 | 0 | 0 | 0 | 1 | 0 | 1 | 0 | 0 | 1 | 1 | 1 | 1 | 1 | 1 | 1 | 0 | 0 | 0 | 0 | 0 | 7 |
| | 65 | 6 | 2072 | 818 | 1 | 0 | 0 | 0 | 0 | 0 | 0 | 1 | 1 | 0 | 0 | 0 | 1 | 1 | 1 | 1 | 1 | 1 | 1 | 0 | 0 | 0 | 0 | 0 | 7 |
| | 65 | 7 | 2076 | 81C | 1 | 0 | 0 | 0 | 0 | 0 | 0 | 1 | 1 | 1 | 0 | 0 | 1 | 1 | 1 | 1 | 1 | 1 | 1 | 0 | 0 | 0 | 0 | 0 | 7 |

FIG. 12

1200

1201

| | | HCLK | DAC | DATA | DATA | BINARY DATA | | | | | | | | | | | | DIFFERENTIAL COMPARISON (n~8) | | | | | | | | | | | | DIFFERENTIAL CALCULATION |
|---|---|---|---|---|---|---|---|---|---|---|---|---|---|---|---|---|---|---|---|---|---|---|---|---|---|---|---|---|---|---|
| | DATA | HCLK | ch | DEC | HEX | 11 | 10 | 9 | 8 | 7 | 6 | 5 | 4 | 3 | 2 | 1 | 0 | 11 | 10 | 9 | 8 | 7 | 6 | 5 | 4 | 3 | 2 | 1 | 0 | |
| | 1 | 1 | 0 | 0 | 0 | 0 | 0 | 0 | 0 | 0 | 0 | 0 | 0 | 0 | 0 | 0 | 0 | | | | | | | | | | | | | |
| | 2 | 1 | 1 | 4 | 4 | 0 | 0 | 0 | 0 | 0 | 0 | 0 | 0 | 0 | 1 | 0 | 0 | 0 | 0 | 0 | 0 | 0 | 0 | 0 | 0 | 0 | 1 | 0 | 0 | 1 |
| | 3 | 1 | 2 | 8 | 8 | 0 | 0 | 0 | 0 | 0 | 0 | 0 | 0 | 1 | 0 | 0 | 0 | 0 | 0 | 0 | 0 | 0 | 0 | 0 | 0 | 1 | 1 | 0 | 0 | 2 |
| | 4 | 1 | 3 | 12 | C | 0 | 0 | 0 | 0 | 0 | 0 | 0 | 0 | 1 | 1 | 0 | 0 | 0 | 0 | 0 | 0 | 0 | 0 | 0 | 0 | 0 | 1 | 0 | 0 | 1 |
| | 5 | 1 | 4 | 16 | 10 | 0 | 0 | 0 | 0 | 0 | 0 | 0 | 1 | 0 | 0 | 0 | 0 | 0 | 0 | 0 | 0 | 0 | 0 | 0 | 1 | 1 | 1 | 0 | 0 | 3 |
| | 6 | 1 | 5 | 20 | 14 | 0 | 0 | 0 | 0 | 0 | 0 | 0 | 1 | 0 | 1 | 0 | 0 | 0 | 0 | 0 | 0 | 0 | 0 | 0 | 0 | 0 | 1 | 0 | 0 | 1 |
| | 7 | 1 | 6 | 24 | 18 | 0 | 0 | 0 | 0 | 0 | 0 | 0 | 1 | 1 | 0 | 0 | 0 | 0 | 0 | 0 | 0 | 0 | 0 | 0 | 0 | 1 | 1 | 0 | 0 | 2 |
| | 8 | 1 | 7 | 28 | 1C | 0 | 0 | 0 | 0 | 0 | 0 | 0 | 1 | 1 | 1 | 0 | 0 | 0 | 0 | 0 | 0 | 0 | 0 | 0 | 0 | 0 | 1 | 0 | 0 | 1 |
| | | | | | | | | | | | | | | | ⋮ | | | | | | | | | | | | | | | |
| 1204 | 497 | 63 | 0 | 1984 | 7C0 | 0 | 1 | 1 | 1 | 1 | 1 | 0 | 0 | 0 | 0 | 0 | 0 | 0 | 0 | 0 | 0 | 0 | 0 | 0 | 0 | 0 | 1 | 0 | 0 | 1 |
| | 498 | 63 | 1 | 1988 | 7C4 | 0 | 1 | 1 | 1 | 1 | 1 | 0 | 0 | 0 | 1 | 0 | 0 | 0 | 0 | 0 | 0 | 0 | 0 | 0 | 0 | 1 | 1 | 0 | 0 | 2 |
| | 499 | 63 | 2 | 1992 | 7C8 | 0 | 1 | 1 | 1 | 1 | 1 | 0 | 0 | 1 | 0 | 0 | 0 | 0 | 0 | 0 | 0 | 0 | 0 | 0 | 0 | 0 | 1 | 0 | 0 | 1 |
| | 500 | 63 | 3 | 1996 | 7CC | 0 | 1 | 1 | 1 | 1 | 1 | 0 | 0 | 1 | 1 | 0 | 0 | 0 | 0 | 0 | 0 | 0 | 0 | 0 | 1 | 1 | 1 | 0 | 0 | 3 |
| | 501 | 63 | 4 | 2000 | 7D0 | 0 | 1 | 1 | 1 | 1 | 1 | 0 | 1 | 0 | 0 | 0 | 0 | 0 | 0 | 0 | 0 | 0 | 0 | 0 | 0 | 0 | 1 | 0 | 0 | 1 |
| | 502 | 63 | 5 | 2004 | 7D4 | 0 | 1 | 1 | 1 | 1 | 1 | 0 | 1 | 0 | 1 | 0 | 0 | 0 | 0 | 0 | 0 | 0 | 0 | 0 | 0 | 1 | 1 | 0 | 0 | 2 |
| | 503 | 63 | 6 | 2008 | 7D8 | 0 | 1 | 1 | 1 | 1 | 1 | 0 | 1 | 1 | 0 | 0 | 0 | 0 | 0 | 0 | 0 | 0 | 0 | 0 | 0 | 0 | 1 | 0 | 0 | 1 |
| | 504 | 63 | 7 | 2012 | 7DC | 0 | 1 | 1 | 1 | 1 | 1 | 0 | 1 | 1 | 1 | 0 | 0 | 0 | 0 | 0 | 0 | 0 | 0 | 1 | 1 | 1 | 1 | 0 | 0 | 4 |
| | 505 | 64 | 0 | 2016 | 7E0 | 0 | 1 | 1 | 1 | 1 | 1 | 1 | 0 | 0 | 0 | 0 | 0 | 0 | 0 | 0 | 0 | 0 | 0 | 0 | 0 | 0 | 1 | 0 | 0 | 1 |
| | 506 | 64 | 1 | 2020 | 7E4 | 0 | 1 | 1 | 1 | 1 | 1 | 1 | 0 | 0 | 1 | 0 | 0 | 0 | 0 | 0 | 0 | 0 | 0 | 0 | 0 | 1 | 1 | 0 | 0 | 2 |
| | 507 | 64 | 2 | 2024 | 7E8 | 0 | 1 | 1 | 1 | 1 | 1 | 1 | 0 | 1 | 0 | 0 | 0 | 0 | 0 | 0 | 0 | 0 | 0 | 0 | 0 | 0 | 1 | 0 | 0 | 1 |
| | 508 | 64 | 3 | 2028 | 7EC | 0 | 1 | 1 | 1 | 1 | 1 | 1 | 0 | 1 | 1 | 0 | 0 | 0 | 0 | 0 | 0 | 0 | 0 | 0 | 1 | 1 | 1 | 0 | 0 | 3 |
| | 509 | 64 | 4 | 2032 | 7F0 | 0 | 1 | 1 | 1 | 1 | 1 | 1 | 1 | 0 | 0 | 0 | 0 | 0 | 0 | 0 | 0 | 0 | 0 | 0 | 0 | 0 | 1 | 0 | 0 | 1 |
| | 510 | 64 | 5 | 2036 | 7F4 | 0 | 1 | 1 | 1 | 1 | 1 | 1 | 1 | 0 | 1 | 0 | 0 | 0 | 0 | 0 | 0 | 0 | 0 | 0 | 0 | 1 | 1 | 0 | 0 | 2 |
| | 511 | 64 | 6 | 2040 | 7F8 | 0 | 1 | 1 | 1 | 1 | 1 | 1 | 1 | 1 | 0 | 0 | 0 | 0 | 0 | 0 | 0 | 0 | 0 | 0 | 0 | 0 | 1 | 0 | 0 | 1 |
| 1202 | 512 | 64 | 7 | 2044 | 7FC | 0 | 1 | 1 | 1 | 1 | 1 | 1 | 1 | 1 | 1 | 0 | 0 | 1 | 1 | 1 | 1 | 1 | 1 | 1 | 1 | 1 | 1 | 0 | 0 | 10 |
| 1203 | 513 | 65 | 0 | 2048 | 800 | 1 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 1 |
| | 514 | 65 | 1 | 2052 | 804 | 1 | 0 | 0 | 0 | 0 | 0 | 0 | 0 | 0 | 1 | 0 | 0 | 0 | 0 | 0 | 0 | 0 | 0 | 0 | 0 | 1 | 1 | 0 | 0 | 2 |
| | 515 | 65 | 2 | 2056 | 808 | 1 | 0 | 0 | 0 | 0 | 0 | 0 | 0 | 1 | 0 | 0 | 0 | 0 | 0 | 0 | 0 | 0 | 0 | 0 | 0 | 0 | 1 | 0 | 0 | 1 |
| | 516 | 65 | 3 | 2060 | 80C | 1 | 0 | 0 | 0 | 0 | 0 | 0 | 0 | 1 | 1 | 0 | 0 | 0 | 0 | 0 | 0 | 0 | 0 | 0 | 1 | 1 | 1 | 0 | 0 | 3 |
| | 517 | 65 | 4 | 2064 | 810 | 1 | 0 | 0 | 0 | 0 | 0 | 0 | 1 | 0 | 0 | 0 | 0 | 0 | 0 | 0 | 0 | 0 | 0 | 0 | 0 | 0 | 1 | 0 | 0 | 1 |
| | 518 | 65 | 5 | 2068 | 814 | 1 | 0 | 0 | 0 | 0 | 0 | 0 | 1 | 0 | 1 | 0 | 0 | 0 | 0 | 0 | 0 | 0 | 0 | 0 | 0 | 1 | 1 | 0 | 0 | 2 |
| | 519 | 65 | 6 | 2072 | 818 | 1 | 0 | 0 | 0 | 0 | 0 | 0 | 1 | 1 | 0 | 0 | 0 | 0 | 0 | 0 | 0 | 0 | 0 | 0 | 0 | 0 | 1 | 0 | 0 | 1 |
| | 520 | 65 | 7 | 2076 | 81C | 1 | 0 | 0 | 0 | 0 | 0 | 0 | 1 | 1 | 1 | 0 | 0 | 0 | 0 | 0 | 0 | 0 | 0 | 1 | 1 | 1 | 1 | 0 | 0 | 4 |

FIG. 16A

| | | HCLK | DAC | DATA | DATA | BINARY DATA | | | | | | | | | | | | DIFFERENTIAL COMPARISON (n−1) | | | | | | | | | | | | DIFFERENTIAL CALCULATION | DATA DIFFERENTIAL CALCULATION |
|---|---|---|---|---|---|---|---|---|---|---|---|---|---|---|---|---|---|---|---|---|---|---|---|---|---|---|---|---|---|---|---|
| | LINE | HCLK | ch | DEC | HEX | 11 | 10 | 9 | 8 | 7 | 6 | 5 | 4 | 3 | 2 | 1 | 0 | 11 | 10 | 9 | 8 | 7 | 6 | 5 | 4 | 3 | 2 | 1 | 0 | | HEX |
| | 481 | 61 | 0 | 1900 | 76C | 0 | 1 | 1 | 1 | 0 | 1 | 1 | 0 | 1 | 1 | 0 | 0 | 0 | 0 | 0 | 0 | 0 | 0 | 0 | 0 | 1 | 1 | 0 | 0 | | |
| | 482 | 61 | 1 | 1800 | 708 | 0 | 1 | 1 | 1 | 0 | 0 | 0 | 0 | 1 | 0 | 0 | 0 | 0 | 0 | 0 | 0 | 0 | 1 | 1 | 0 | 1 | 1 | 0 | 0 | | |
| 1603 | 483 | 61 | 2 | 1923 | 783 | 0 | 1 | 1 | 1 | 1 | 0 | 0 | 0 | 0 | 0 | 1 | 1 | 0 | 0 | 0 | 0 | 1 | 1 | 1 | 0 | 1 | 0 | 1 | 1 | | |
| 1604 | 484 | 61 | 3 | 1923 | 783 | 0 | 1 | 1 | 1 | 1 | 0 | 0 | 0 | 0 | 0 | 1 | 1 | 0 | 0 | 0 | 0 | 1 | 1 | 1 | 0 | 1 | 1 | 1 | 1 | | |
| | 485 | 61 | 4 | 500 | 1F4 | 0 | 0 | 0 | 1 | 1 | 1 | 1 | 1 | 0 | 1 | 0 | 0 | 0 | 1 | 1 | 0 | 1 | 0 | 0 | 0 | 0 | 1 | 0 | 0 | | |
| | 486 | 61 | 5 | 520 | 208 | 0 | 0 | 1 | 0 | 0 | 0 | 0 | 0 | 1 | 0 | 0 | 0 | 0 | 1 | 0 | 1 | 0 | 1 | 1 | 1 | 1 | 1 | 0 | 0 | | |
| | 487 | 61 | 6 | 560 | 230 | 0 | 0 | 1 | 0 | 0 | 0 | 1 | 1 | 0 | 0 | 0 | 0 | 0 | 1 | 0 | 1 | 0 | 1 | 0 | 0 | 1 | 0 | 0 | 0 | | |
| | 488 | 61 | 7 | 526 | 20E | 0 | 0 | 1 | 0 | 0 | 0 | 0 | 0 | 1 | 1 | 1 | 0 | 0 | 1 | 0 | 1 | 0 | 1 | 0 | 1 | 0 | 0 | 1 | 0 | | |
| | 489 | 62 | 0 | 2048 | 800 | 1 | 0 | 0 | 0 | 0 | 0 | 0 | 0 | 0 | 0 | 0 | 0 | 1 | 1 | 1 | 1 | 0 | 1 | 1 | 0 | 1 | 1 | 0 | 0 | 8 (c) | 094 |
| | 490 | 62 | 1 | 2047 | 7FF | 0 | 1 | 1 | 1 | 1 | 1 | 1 | 1 | 1 | 1 | 1 | 1 | 0 | 0 | 0 | 0 | 1 | 1 | 1 | 1 | 0 | 1 | 1 | 1 | 6 (a) | 0F7 |
| 1600 | 491 | 62 | 2 | 2046 | 7FE | 0 | 1 | 1 | 1 | 1 | 1 | 1 | 1 | 1 | 1 | 1 | 0 | 0 | 0 | 0 | 0 | 0 | 1 | 1 | 1 | 1 | 1 | 0 | 1 | 5 | 07B ○ |
| 1601 | 492 | 62 | 3 | 2045 | 7FD | 0 | 1 | 1 | 1 | 1 | 1 | 1 | 1 | 1 | 1 | 0 | 1 | 0 | 0 | 0 | 0 | 0 | 1 | 1 | 1 | 1 | 1 | 1 | 0 | 6 (a) | 07A ○ |
| | 493 | 62 | 4 | 2044 | 7FC | 0 | 1 | 1 | 1 | 1 | 1 | 1 | 1 | 1 | 1 | 0 | 0 | 0 | 1 | 1 | 0 | 0 | 0 | 0 | 0 | 1 | 0 | 0 | 0 | 3 | 608 |
| | 494 | 62 | 5 | 2043 | 7FB | 0 | 1 | 1 | 1 | 1 | 1 | 1 | 1 | 1 | 0 | 1 | 1 | 0 | 1 | 0 | 1 | 1 | 1 | 1 | 1 | 0 | 0 | 1 | 1 | 7 (b) | 5F3 |
| | 495 | 62 | 6 | 2042 | 7FA | 0 | 1 | 1 | 1 | 1 | 1 | 1 | 1 | 1 | 0 | 1 | 0 | 0 | 1 | 0 | 1 | 1 | 1 | 0 | 0 | 1 | 0 | 1 | 0 | 6 (a) | 5CA |

FIG. 16B

| | HCLK | DAC | DATA | DATA | BINARY DATA | | | | | | | | | | | | DIFFERENTIAL COMPARISON (n−1) | | | | | | | | | | | | DIFFERENTIAL CALCULATION | DATA DIFFERENTIAL CALCULATION | |
|---|---|---|---|---|---|---|---|---|---|---|---|---|---|---|---|---|---|---|---|---|---|---|---|---|---|---|---|---|---|---|---|
| LINE | HCLK | ch | DEC | HEX | 11 | 10 | 9 | 8 | 7 | 6 | 5 | 4 | 3 | 2 | 1 | 0 | 11 | 10 | 9 | 8 | 7 | 6 | 5 | 4 | 3 | 2 | 1 | 0 | | HEX | |
| 496 | 62 | 7 | 2041 | 7F9 | 0 | 1 | 1 | 1 | 1 | 1 | 1 | 1 | 1 | 0 | 0 | 1 | 0 | 1 | 0 | 1 | 1 | 1 | 1 | 1 | 0 | 1 | 1 | 1 | 8 (c) | 5EB | |
| 1605 497 | 63 | 0 | 2041 | 7F9 | 0 | 1 | 1 | 1 | 1 | 1 | 1 | 1 | 1 | 0 | 0 | 1 | 1 | 1 | 1 | 1 | 1 | 1 | 1 | 1 | 1 | 0 | 0 | 1 | 9 (d) | 007 | ○ |
| 498 | 63 | 1 | 2042 | 7FA | 0 | 1 | 1 | 1 | 1 | 1 | 1 | 1 | 1 | 0 | 1 | 0 | 0 | 0 | 0 | 0 | 0 | 0 | 0 | 0 | 0 | 1 | 0 | 1 | 1 | 005 | ○ |
| 499 | 63 | 2 | 2043 | 7FB | 0 | 1 | 1 | 1 | 1 | 1 | 1 | 1 | 1 | 0 | 1 | 1 | 0 | 0 | 0 | 0 | 0 | 0 | 0 | 0 | 0 | 1 | 0 | 1 | 1 | 003 | ○ |
| 500 | 63 | 3 | 2044 | 7FC | 0 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 1 | 0 | 001 | ○ |
| 501 | 63 | 4 | 2045 | 7FD | 0 | 1 | 1 | 1 | 1 | 1 | 1 | 1 | 1 | 1 | 0 | 1 | 0 | 0 | 0 | 0 | 0 | 0 | 0 | 0 | 0 | 0 | 0 | 1 | 0 | 001 | ○ |
| 502 | 63 | 5 | 2046 | 7FE | 0 | 1 | 1 | 1 | 1 | 1 | 1 | 1 | 1 | 1 | 1 | 0 | 0 | 0 | 0 | 0 | 0 | 0 | 0 | 0 | 0 | 1 | 0 | 1 | 1 | 003 | ○ |
| 503 | 63 | 6 | 2047 | 7FF | 0 | 1 | 1 | 1 | 1 | 1 | 1 | 1 | 1 | 1 | 1 | 1 | 0 | 0 | 0 | 0 | 0 | 0 | 0 | 0 | 0 | 1 | 0 | 1 | 1 | 005 | ○ |
| 504 | 63 | 7 | 2048 | 800 | 1 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 9 (d) | 007 | ○ |
| 505 | 64 | 0 | 2016 | 7E0 | 0 | 1 | 1 | 1 | 1 | 1 | 1 | 0 | 0 | 0 | 0 | 0 | 0 | 0 | 0 | 0 | 0 | 0 | 0 | 1 | 1 | 0 | 0 | 1 | 2 | 019 | ○ |
| 506 | 64 | 1 | 2020 | 7E4 | 0 | 1 | 1 | 1 | 1 | 1 | 1 | 0 | 0 | 1 | 0 | 0 | 0 | 0 | 0 | 0 | 0 | 0 | 0 | 1 | 1 | 1 | 1 | 0 | 4 | 016 | ○ |
| 507 | 64 | 2 | 2024 | 7E8 | 0 | 1 | 1 | 1 | 1 | 1 | 1 | 0 | 1 | 0 | 0 | 0 | 0 | 0 | 0 | 0 | 0 | 0 | 0 | 1 | 0 | 0 | 1 | 1 | 2 | 013 | ○ |
| 508 | 64 | 3 | 2028 | 7EC | 0 | 1 | 1 | 1 | 1 | 1 | 1 | 0 | 1 | 1 | 0 | 0 | 0 | 0 | 0 | 0 | 0 | 0 | 0 | 1 | 0 | 0 | 0 | 0 | 1 | 010 | ○ |
| 509 | 64 | 4 | 2032 | 7F0 | 0 | 1 | 1 | 1 | 1 | 1 | 1 | 1 | 0 | 0 | 0 | 0 | 0 | 0 | 0 | 0 | 0 | 0 | 0 | 0 | 1 | 1 | 0 | 1 | 2 | 00D | ○ |
| 510 | 64 | 5 | 2036 | 7F4 | 0 | 1 | 1 | 1 | 1 | 1 | 1 | 1 | 0 | 1 | 0 | 0 | 0 | 0 | 0 | 0 | 0 | 0 | 0 | 0 | 1 | 0 | 1 | 0 | 2 | 00A | ○ |
| 511 | 64 | 6 | 2040 | 7F8 | 0 | 1 | 1 | 1 | 1 | 1 | 1 | 1 | 1 | 0 | 0 | 0 | 0 | 0 | 0 | 0 | 0 | 0 | 0 | 0 | 0 | 1 | 1 | 1 | 2 | 007 | ○ |
| 512 | 64 | 7 | 2048 | 800 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 000 | ○ |

DISPLAY CONTROL APPARATUS AND METHOD OF CONTROLLING THE DISPLAY CONTROL DEVICE

BACKGROUND OF THE INVENTION

1. Field of the Invention

The present invention relates to a display control apparatus to display an image on a display device such as a liquid crystal display panel and a method of controlling the display control device.

2. Description of the Related Art

Conventionally, in a liquid crystal display having an active matrix, occurrence of a line image due to influence of noise of an image signal noise, noise of an output circuit and the like may degrade image quality. Japanese Patent Laid-Open No. 2003-99016 (counterpart U.S. Pat. Nos. 6,943,765 and 7,598, 969) proposes correcting an output difference between D/A converter channels with respect to an error by each system which occurs upon generation of phase-expanded image signal by a D/A converter, thereby reducing occurrence of a line image due to the output error.

However, the technique disclosed in Japanese Patent Laid-Open No. 2003-99016 reduces the line image that occurs due to an output error between the D/A converter channels, but does not reduce the influence on an image due to a change in image data.

For example, when 12-bit digital data that is input into the D/A converter changes from (100000000000) to (011111111111), the change in the digital data appears through the ground or wired pattern in an analog signal as an output from the D/A converter. This is called DAC output noise. As a result, the noise is displayed as a display image noise (vertical line noise). Conventionally, reduction of such noise has not been considered.

SUMMARY OF THE INVENTION

An aspect of the present invention is to eliminate the above-mentioned problems with the conventional technology.

According to an aspect of the present invention, there is provided a display control apparatus for driving a display panel to display an image, comprising:

a generation unit configured to generate a display image signal having a plurality of bits based on an input image signal;

a converter configured to time-divisionally convert the display image signal into an analog signal;

a driving unit configured to drive the display panel to display an image based on the analog signal converted by the converter;

a determination unit configured to determine whether or not a number of different bits in the plurality of bits of the display image signals that are to be continuously converted by the converter are different from each other is equal to or more than a predetermined value; and a controller configured to control the generation unit to modify the display image signal if the determination unit determines that the number of different bits is equal to or more than the predetermined value.

Further features and advantages of the present invention will become apparent from the following description of the preferred embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 depicts a view illustrating an example of bit based data differences on the timing chart in FIG. 7;

FIG. 12 depicts a view illustrating an example of bit based differences according to the second embodiment;

FIGS. 16A and 16B depict views illustrating an example of data differences and bit based differences according to the third embodiment.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

A schematic configuration of a display system DS1 according to a first embodiment of the present invention will be described using FIG. 1. Note that in the present embodiment, a display apparatus 1000 to display an image on a liquid crystal display panel 100 as a display panel is described as a display control device of the present invention, however, other display control devices than the above display control device such as a plasma or EL (Electro-Luminescence) display panel to control a display of an image on a display panel may be used.

Figure 1:
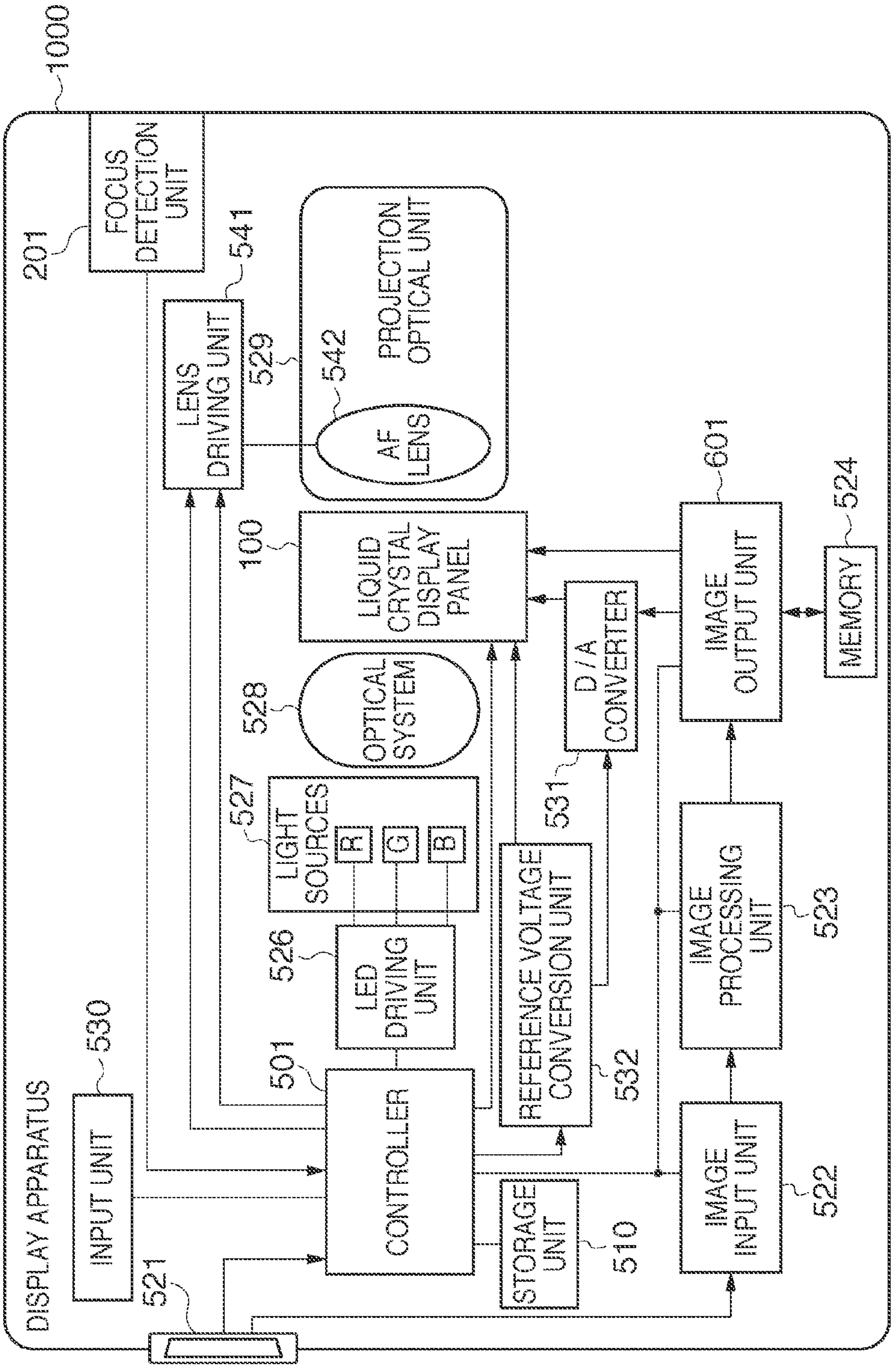
FIG. 1 is a block diagram showing a configuration of a display device according to a first embodiment of the present invention.

FIG. 1 is a block diagram showing a configuration of the display apparatus 1000 according to a first embodiment of the present invention.

In FIG. 1, a controller 501 performs various calculations and controls the operation of the entire display apparatus

1000. A storage unit 510, connected to the controller 501, holds setting values and the like for various units to be described later. The controller 501 performs settings and the like of the respective units in accordance with the setting values stored in the storage unit 510. A focus detection unit 201, having a focus detection sensor, performs auto-focusing. The focus detection sensor has a spectacle lenses (not shown) and a pair of line sensors to receive light beams incident from the spectacle lenses. The focus detection unit 201 performs calculation based on contrast positions of the respective line sensors, and performs auto-focusing to detect a distance for a screen for projection or the like. A focus detection signal obtained based on the phase difference is input into the controller 501. The controller 501 outputs a lens control signal to a lens driving unit 541 based on the focus detection signal input from the focus detection unit 201. Thus, an AF lens 542 included in a projection optical unit 529 is driven so as to focus an image on a liquid crystal display panel (display panel) 100 to be described later on a projection unit such as a screen.

As a flow of video image signal, in the case of a display device such as a projector, an image signal is input via the input terminal 521 from an external video source (not shown). Then the controller 501 transmits a control signal to an image input unit 522 based on setting information and the like from an input unit 530 including a power source switch, a mode switch and the like provided in the display apparatus 1000. The image input unit 522 performs A/D conversion processing, decoding processing or the like on the image signal input from the input terminal 521 in accordance with the control signal from the controller 501. Then an image processing unit 523 performs noise reduction, edge enhancement, image scaling and the like, and outputs the image data to an image output unit 601. Note that in this embodiment, the image processing unit 523 functions as a signal generator to generate image data phase-expanded for 8 channels as shown in FIG. 2B. In the present embodiment, the image output unit 601 outputs a display image signal to the liquid crystal display panel 100.

The image output unit 601 and a memory 524 generate a synchronizing signal at double-speed drive timing from the image data input from the image processing unit 523, and perform processing such as gamma conversion. Thus, an image signal for driving the liquid crystal display panel 100 is generated and output. The image signal for driving the liquid crystal display panel 100 is converted with a D/A converter 531 into an analog signal. The liquid crystal display panel 100 receives the synchronizing signal at the double-speed drive timing and a liquid crystal drive signal converted with the D/A converter 531, i.e. so-called video signal, and displays an image. An LED driving unit 526 receives the drive signal from the controller 501, and turns on LEDs as the light sources 527. The lights from the light sources 527 are converted with an optical system 528 into collimated light rays, and the image displayed on the liquid crystal display panel 100 is projected via a projection optical system 529 on the screen. A reference voltage conversion unit 532, having plural output channels, receives the signal from the controller 501 and generates a voltage Vcom for the liquid crystal display panel 100, and generates a setting voltage for the D/A converter 531.

Figure 2A:
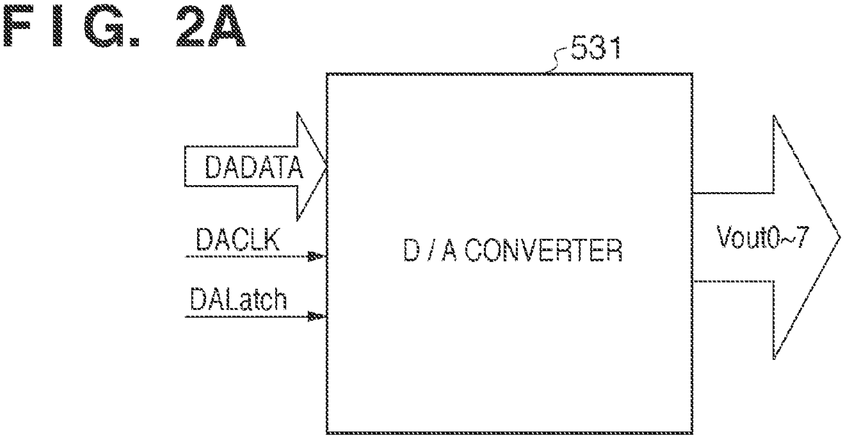
FIGS. 2A and 2B are block diagrams showing a D/A converter according to the first embodiment.
Figure 2B:
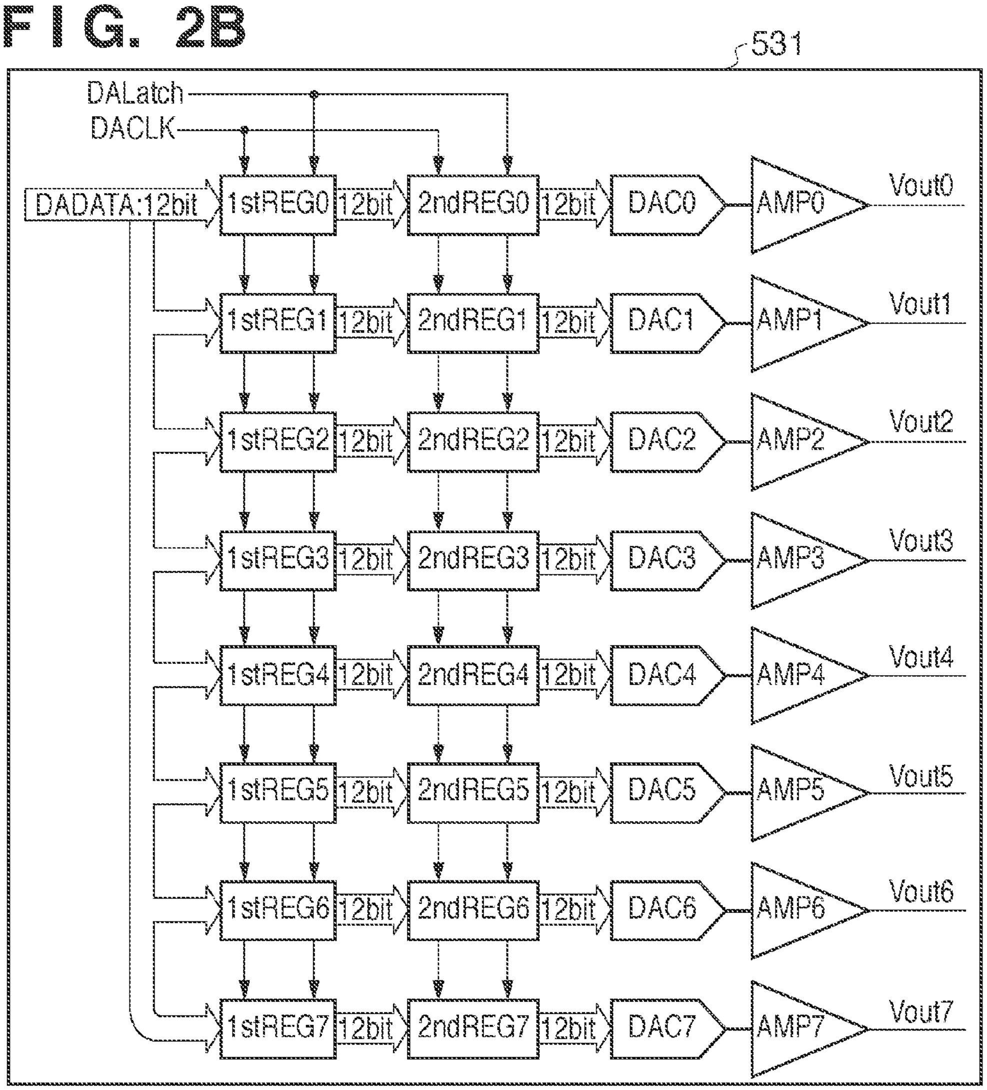

FIGS. 2A and 2B are block diagrams showing the D/A converter 531 according to the present embodiment.

In FIG. 2A, the D/A converter 531 receives input signals DACLK, DADATA and DALatch from the image output unit 601, and generates image signals Vout0 to Vout7 as liquid crystal drive signals. The DACLK signal is a synchronizing clock of the image signal, the DADATA signal is an image signal (input data), and the DALatch signal is a latch signal to latch the image signal in the D/A converter 531.

FIG. 2B is a block diagram showing a configuration of the D/A converter 531 according to the present embodiment.

The image signal DADATA is input in synchronization with the DACLK signal, and the display image signals Vout0 to Vout7, divided for plural systems (plural channels) are output in synchronization with the DACLK signal. That is, the DATATA 0 to 7 signals are latched in the registers (1stREG0 to 1stREG7) of the D/A converter 531 at the rising edge of the DACLK signal. In this example, the display image signals Vout0 to Vout7 are provided for 8 channels. Accordingly, when the DATATA signals for 8 clocks of the DACLK signal have been transferred, the data latched in the registers (1stREG0 to 1stREG7) is transferred at the falling edge of the DALatch signal and latched in registers (2ndREG0 to 2ndREG7). That is, upon this transfer, the data in 12 bit×8 (DAC0 to DAC7) is replaced with its previous data. Numerals DAC0 to DAC7 denote D/A converters which output voltages to drive liquid crystal in correspondence with 12 bit data supplied from the registers (2ndREG0 to 2ndREG7). The voltages output from the D/A converters DAC0 to DAC7 are input into amplifiers (AMP0 to AM07) and amplified to voltage signals to drive the liquid crystal, then input into the liquid crystal display panel 100. This operation is repeated so as to generate a display image signal for the liquid crystal display panel 100.

Figure 3A:
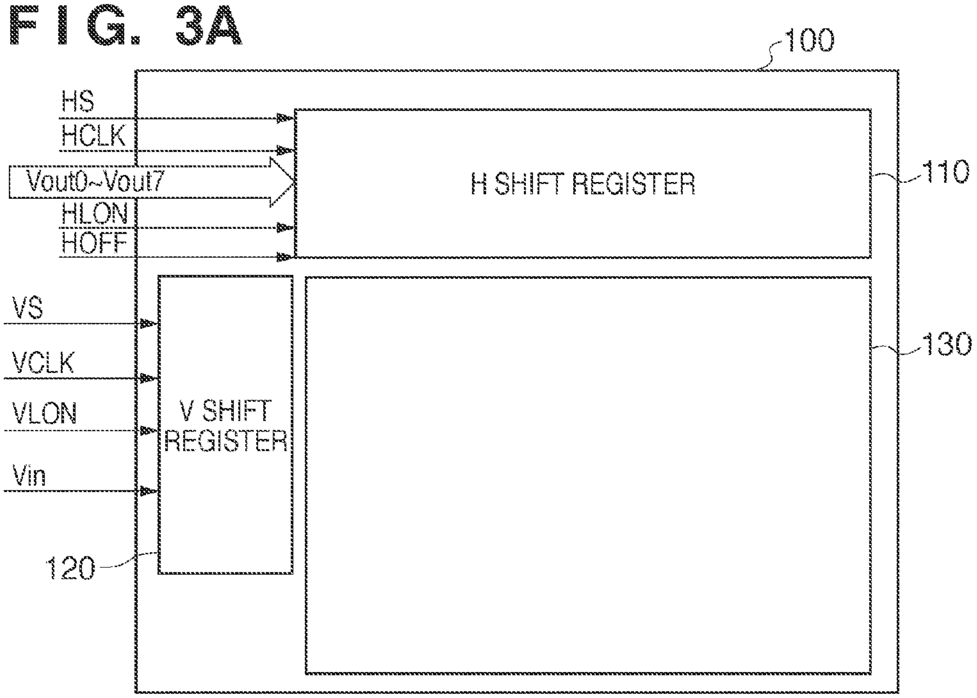
FIG. 3A is a block diagram showing a configuration of a liquid crystal display panel.

FIG. 3A is a block diagram showing a configuration of the liquid crystal display panel 100 according to the present embodiment.

The liquid crystal display panel 100 has an H shift register 110, a V shift register 120, and a pixel area 130.

Figure 3B:
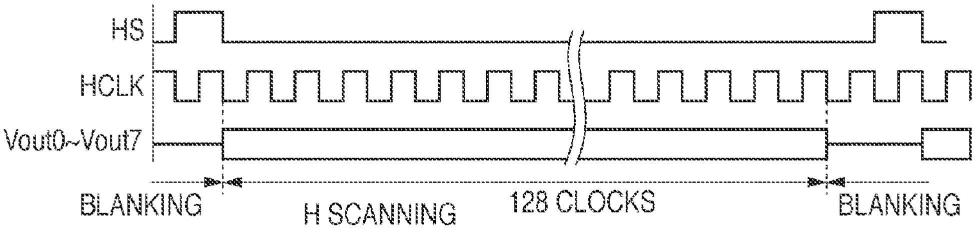
FIGS. 3B and 3C are timing charts showing H and V scannings in the liquid crystal display panel.
Figure 3C:
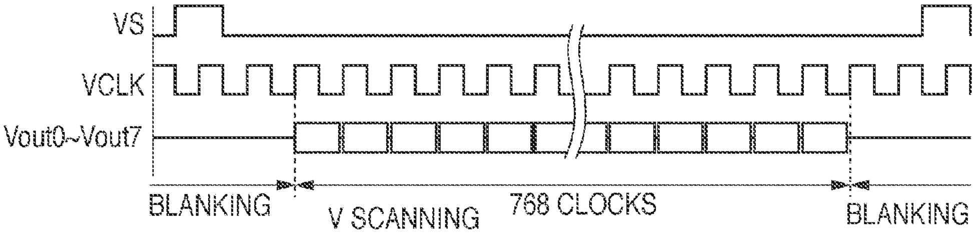

FIGS. 3B and 3C are timing charts showing H and V scannings in the liquid crystal display panel 100. FIG. 3B shows horizontal scanning timing, and FIG. 3C shows vertical scanning timing. An HCLK signal is a horizontal phase clock (image signal clock). During one clock cycle of the HCLK signal, image data of 8 channels in the horizontal direction is output.

An HS signal is a horizontal synchronizing signal. While the display image signals Vout0 to Vout7 are updated by one clock cycle of the HCLK signal with the HS signal as a reset signal and a start signal for the H shift register 110, 8 signal lines (Vout0 to Vout7) are driven and scanning is performed in the vertical direction. Note that the HCLK signal and the DALatch signal shown in FIG. 2 have the same frequency. For example, when the resolution of the liquid crystal display panel 100 is XGA H(1024)×V(768), scanning of the display portion of the liquid crystal display panel 100 is performed in the horizontal direction for 128 clocks of the HCLK signal. Further, with the next HS signal as a reset signal and a start signal for the H shift register 110, the horizontal scanning for the next line is performed. Actually, the horizontal scanning is performed for a predetermined number of clocks, that is, a predetermined number of clocks for so-called blanking is added to 128 clocks of the HCLK signal necessary for the horizontal scanning.

Upon vertical scanning, with the vertical synchronizing signal VS as a reset signal and a start signal for the V shift register 120, the V shift register 120 shifts a horizontal scanning line by 1 line by 1 clock of the VCLK signal. Note that assuming that the resolution is XGA H(1024)×V(768), the vertical direction display scanning in the liquid crystal display panel 100 is performed by 768 clocks of the VCLK signal. Actually, as in the case of the horizontal scanning, the vertical scanning is performed by a predetermined number of clocks, that is, a predetermined number of clocks for so-called blanking is added to the 768 clocks of the VCLK signal necessary for the vertical direction scanning. In both horizontal scanning and vertical scanning, the number of blankings is arbitrarily set with the image output unit 601. Note that the VCLK signal is a synchronizing clock (line clock) for the horizontal scanning line.

Then, the liquid crystal drive signal is applied to the pixel area 130 (FIG. 3A) of the liquid crystal display panel 100, based on the above-described horizontal scanning signal and the vertical scanning signal. Further, the liquid crystal drive signal having an 8-pixel black region (where voltage Vcom is applied to the pixels) in top, bottom and left and right positions in the H(1024)×V(768) pixels is applied to the pixel area 130 in accordance with a blanking clock.

Figure 4:
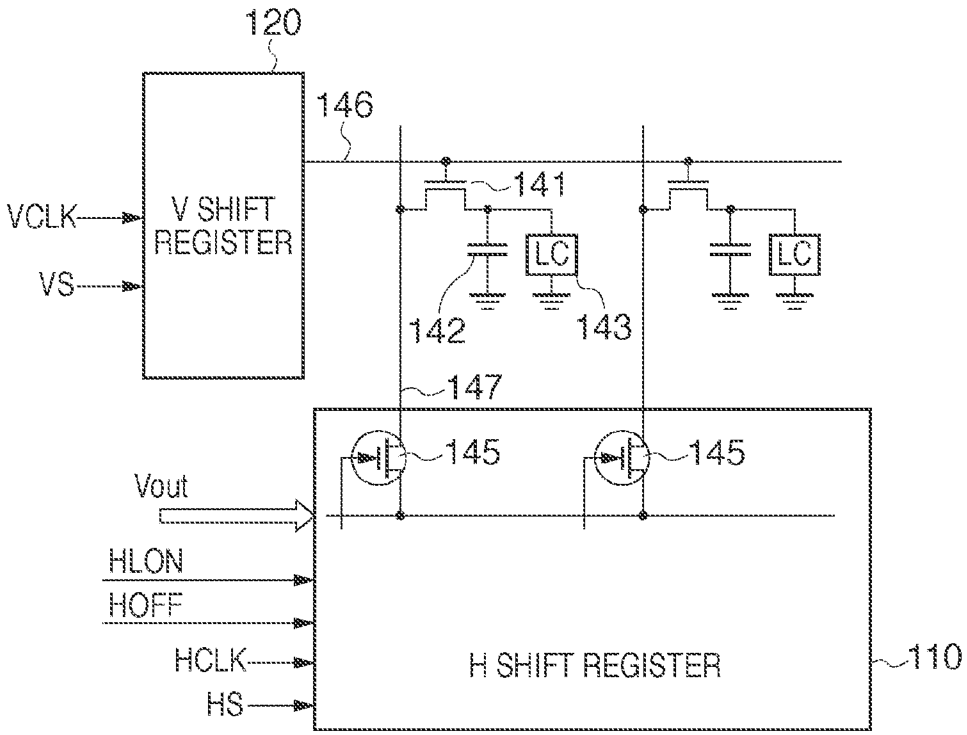
FIG. 4 is a block diagram showing a circuit configuration of a pixel section of the liquid crystal display panel.

FIG. 4 is a block diagram showing a circuit configuration of the pixel area 130.

The H shift register 110 inputs the display image signals Vout0 to Vout7 in synchronization with the HCLK signal and performs shift of the signals. The H shift register 110 turns on a transfer switch (pixel electrode) 145 in correspondence with the Vout signal from the D/A converter 531 thereby drives a data line 147. A gate signal 146 is output from the V shift register 120 to drive the gate of a switching device 141 to store a voltage corresponding to the Vout signal on the data line 147 into a pixel capacitance (capacitor) 142. In a liquid crystal LC 143, the light transmittance polarized with a polarizing plate (not shown) is changed in correspondence with a voltage charged in the pixel capacitance 142.

Figure 5:
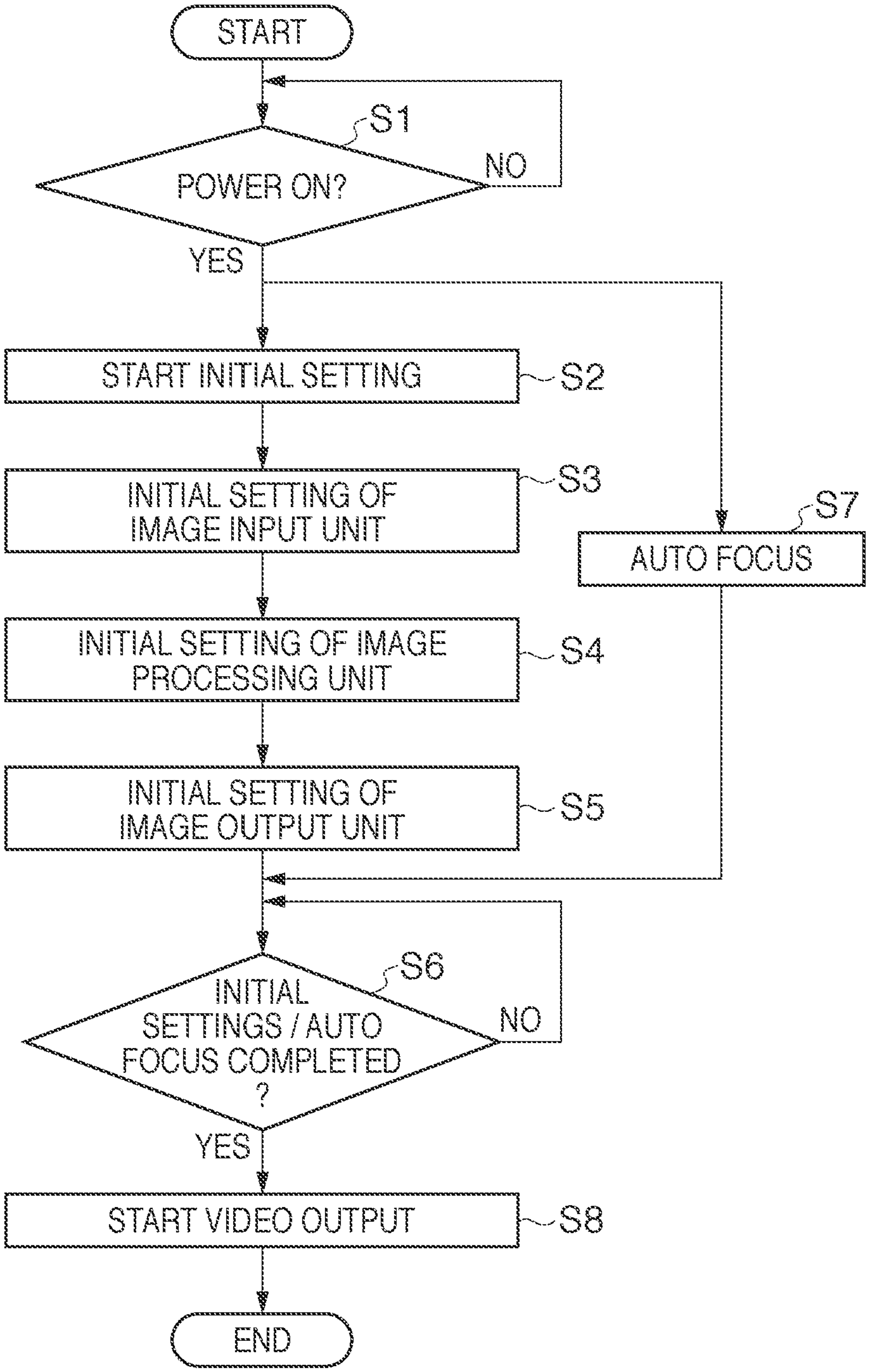
FIG. 5 is a flowchart describing an operation of the display device according to the first embodiment.

The operation of the display apparatus 1000 having the above structure will be described with reference to the flowchart of FIG. 5.

First, in step S1, it is determined whether or not the power switch of the input unit 530 is on. When it is determined in step S1 that the power is on, the process proceeds to step S2, in which initial setting is started, and the controller 501 reads initial setting values stored in the storage unit 510. Then, initial setting of the image input unit 522 is performed in step S3, then, initial setting of the image processing unit 523 is performed in step S4, and initial setting of the image output unit 601 is performed in step S5. Further, when it is determined in step S1 that the power is on, in parallel with the initial settings in steps S2 to S5, auto-focusing is performed in step S7. Then the process proceeds to step S6, in which it is determined whether or not the initial setting of the image input unit 522, the initial setting of the image processing unit 523, the initial setting of the image output unit 601 and the auto-focusing in step S7 have been completed. When it is determined in step S7 that these processings have been completed, the process proceeds to video display processing in step S8. In step S8, a video signal input from the input terminal 521 is processed with the image input unit 522, the image processing unit 523 and the image output unit 601, and converted with the D/A converter 531 into a voltage signal, and liquid crystal driving is started.

Next, the video display processing in step S8 will be described with reference to FIGS. 1, 6A and 6B.

Figure 6A:
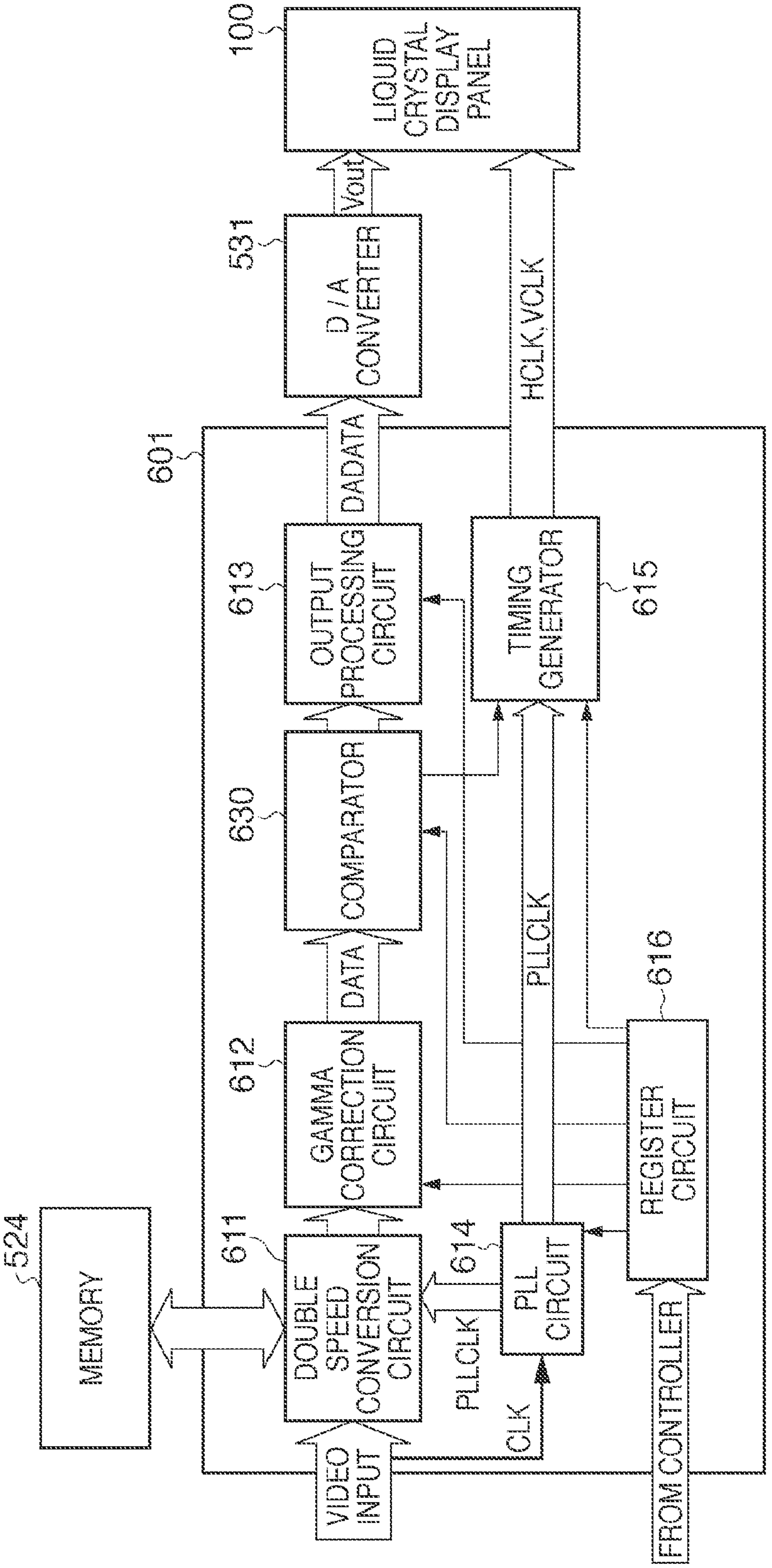
FIG. 6A is a block diagram showing a configuration of an image output unit.

FIG. 6A is a block diagram showing a configuration of the image output unit 601 according to the present embodiment. FIG. 6B is a block diagram showing a configuration of a comparator 630 of the image output unit 601.

An image signal of a display subject is input via the input terminal 521 from an external video source. The controller 501 transmits a control signal to the image input unit 522 based on setting information and the like from the input unit 530. The image input unit 522 performs A/D conversion, decoding processing or the like on the image signal input from the input terminal 521 based on the control signal. Then the image processing unit 523 performs noise reduction, edge enhancement, image scaling and the like, and inputs the processed image data (video data) into the image output unit 601.

In FIG. 6A, the image output unit 601 receives the input video data, then writes the input 1-frame video signal into the memory 524 with a double speed conversion circuit 611. Then, the image output unit 601 generates a data signal to perform double speed drive (120 Hz drive) to output the video data at 60 Hz twice by reading the 1-frame video data twice. A gamma correction circuit 612 receives the data signal output from the double speed conversion circuit 611, and performs correction on the data signal in correspondence with the gamma characteristic of the liquid crystal display panel 100.

Figure 6B:
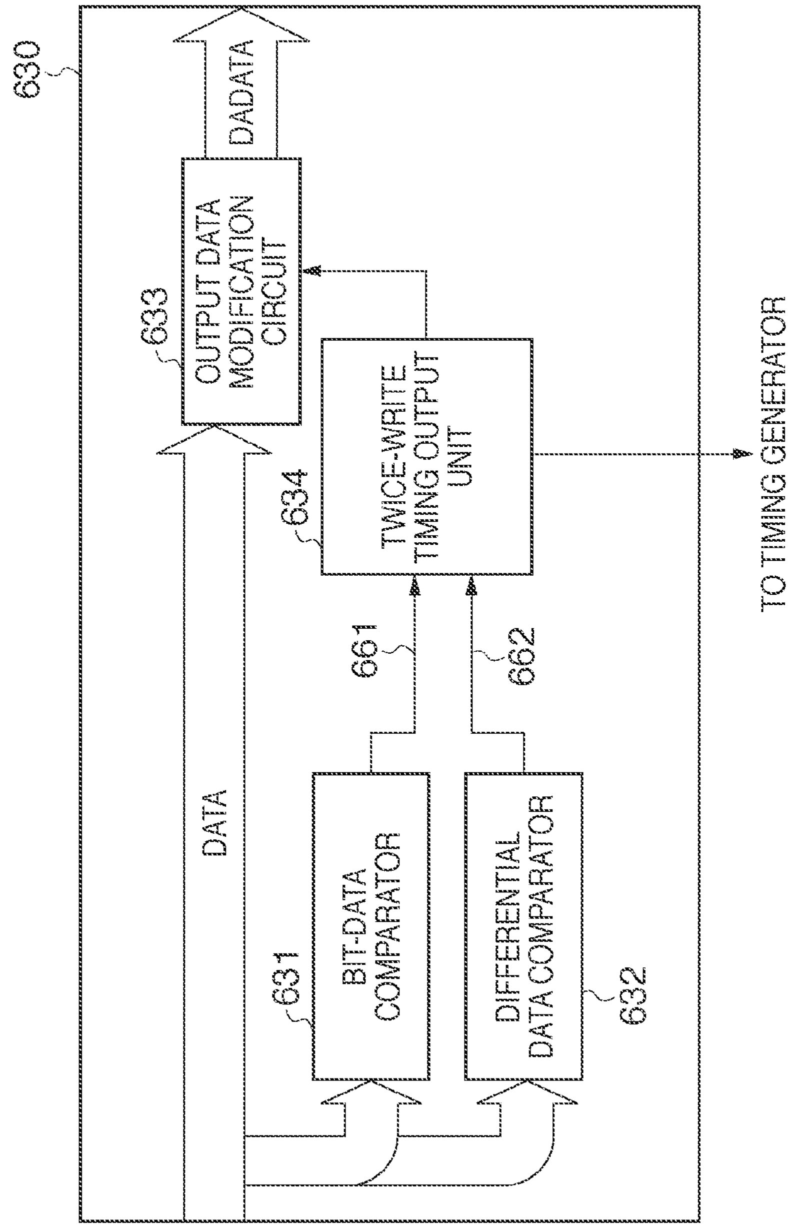
FIG. 6B is a block diagram showing a configuration of a comparator.

FIG. 6B is a block diagram showing a configuration of the comparator 630 according to the present embodiment.

In the data signal output from the gamma correction circuit 612, adjacent image data (image signals) are compared by bit with a bit-data comparator 631 of the comparator 630. It is determined whether or not the number of unmatched bits in the bit-based comparison is equal to or greater than a predetermined value, and if it is determined that the number of unmatched bits is equal to or greater than the predetermined value, then a signal 661 is output. Further, a differential data comparator 632 calculates a difference between the adjacent image data, and if the difference is equal to or less than a predetermined value, then a signal 662 is output. In accordance with the signals 661 and 662 output from these comparators, a twice-write timing output unit 634 issues an instruction of output data modification to an output data modification circuit 633. Further, the twice-write timing output unit 634 issues a liquid-crystal drive timing change signal to a timing generator 615. Note that the details of the comparator 630 will be described later.

An output processing circuit 613 performs data rearrangement in accordance with the scanning directions, the horizontal and vertical directions of the liquid crystal display panel 100, and outputs the data to the D/A converter 531. The D/A converter 531 converts the input data DADATA into an analog signal and outputs the signal as a liquid crystal drive signal (voltage) to drive the liquid crystal display panel 100. A PLL circuit 614 optimizes the phase of the clock/data in the respective circuits. The timing generator 615 functions as a synchronizing signal generating circuit to output timing signals for the H shift register 110 and the V shift register 120 with respect to the liquid crystal drive signal (voltage) output from the D/A converter 531 to the liquid crystal display panel 100. The register circuit 616 performs setting of the respective circuits and writing of adjustment values.

Figure 7:
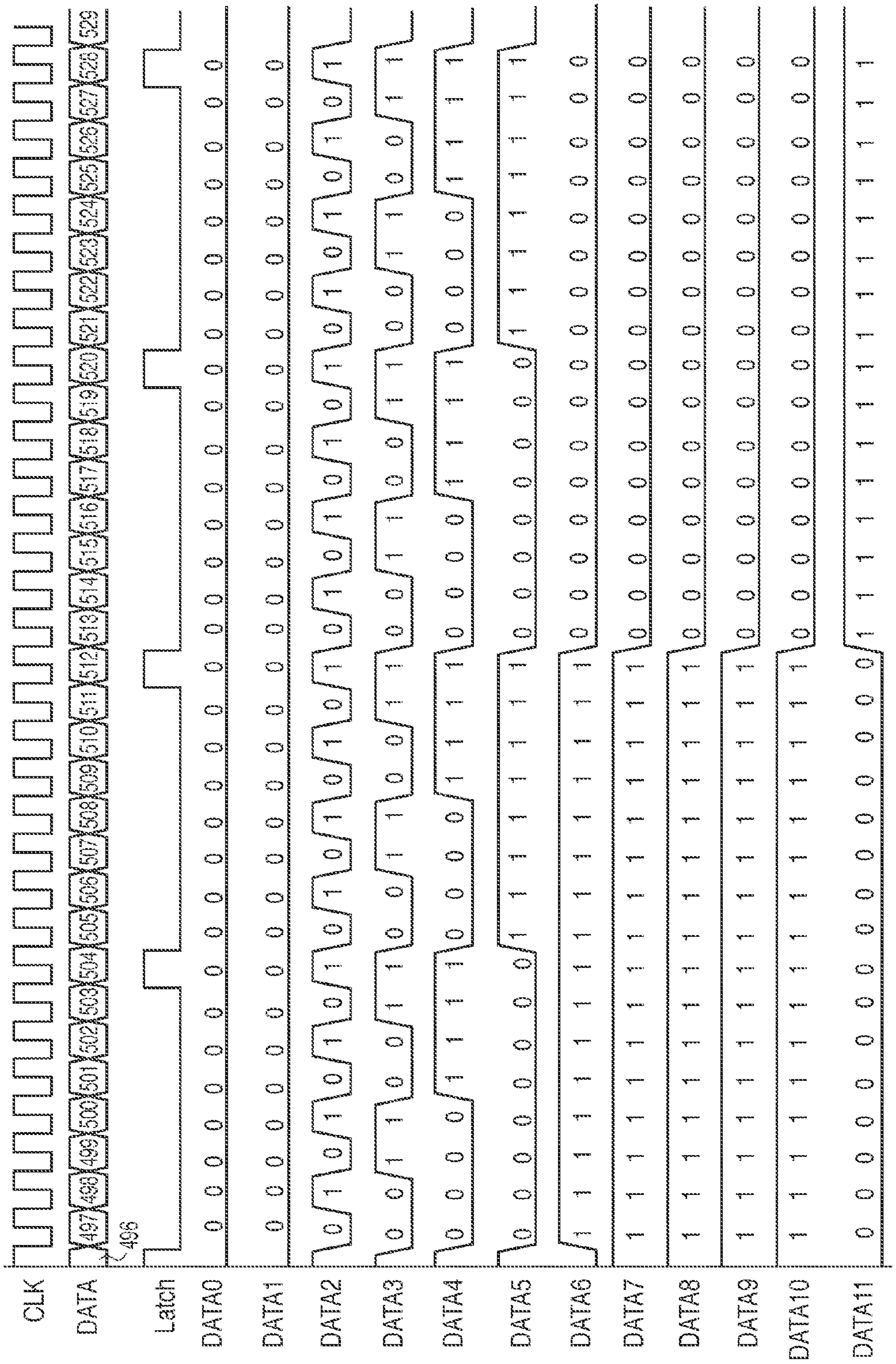
FIG. 7 is a timing chart describing an example of the operation of the comparator.

FIG. 7 is a timing chart showing the operation of the comparator 630.

In FIG. 7, a signal CLK is a synchronizing clock for video data, and DATA0 to DATA7, image data output from the gamma correction circuit 612. In this example, the DATA is transferred in synchronization with the rising edge of the CLK signal. As the data at this time is 12-bit data, it is represented as DATA0 to DATA11. As described above, the D/A converter 531 outputs Vout signals (Vout0 to Vout7) for 8 channels, the DATA is transferred for 8 clocks, then as in the case of the DALatch signal, a latch signal (Latch) is output by the DATA signal of 8 clocks.

Note that in FIG. 7, numerals in the DATA signal represent the order of the data writing in the horizontal direction in the liquid crystal display panel 100. For example, DATA "497" indicates the 497th data having a 12-bit value "1984" (01111100000).

FIG. 8 depicts a view illustrating an example of bit based data differences on the timing chart in FIG. 7. In FIG. 8, the DATA is arrayed sequentially from the top in the data writing order in the horizontal direction in the liquid crystal display panel 100. In this example, the DATA indicates the horizontal direction data itself. Accordingly, the DATA "1984" denoted by numeral 800 is the 497th data as shown in FIG. 7. In FIG. 8, "HCKL" denotes the number of clocks of the HCLK signal from the start of data writing in one horizontal line of the liquid crystal display panel 100. As the D/A converter 531 has 8-channel outputs, the HCKL value is incremented by 1 by 8 DATA. In this example, the HCLK signal is a clock by 8 phases. "DAC" denotes data of the display image signals Vout0 to Vout7 output from the D/A converter 531. "DATA (DEC)" is decimal notation of the data, "DATA (HEX)", hexadecimal notation of the data; "Binary data", a binary number corresponding to the DATA; and "Differential comparison", a bit difference of the binary data per one cycle of HCLK, for example, a difference by bit between the DATA (1984) denoted by numeral 800 and DATA (2016) after one cycle of HCLK denoted by numeral 801. The binary number of the DATA "1984" is (011111000000). The binary number of the DATA "2016" is (011111100000). These binary numbers are compared by bit, and an unmatched bit is obtained. In the comparison between the DATA "1984" (011111000000) and the DATA "2016" (011111100000), only the 5th bits are different, the difference is "1". The result of comparison is described as a differential calculation of the DATA "2016".

Figure 9:
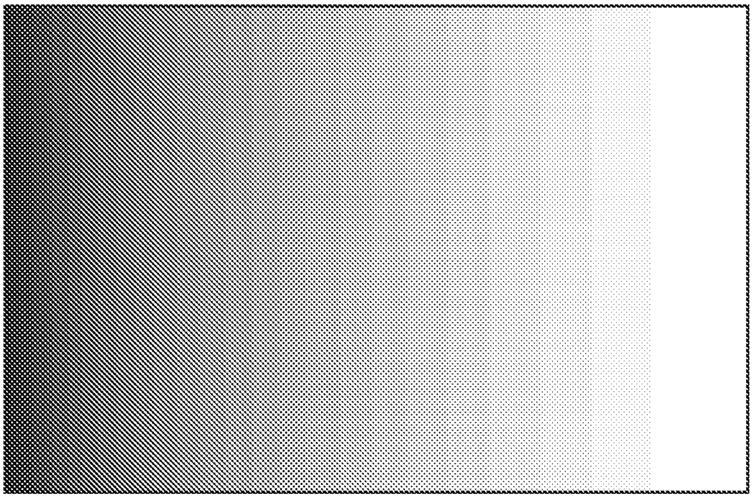
FIG. 9 depicts a view illustrating an example of a lamp image showing gradation from black to white.

FIG. 9 depicts a view illustrating an example of a lamp image showing gradation from black to white.

In this image, in a left end black part, the DATA value is "000HEX" (black), then the DATA value is "004HEX", and the value is simply incremented by "004HEX" in synchronization with the CLK signal, corresponding to the DATA (image data) shown in FIG. 8. Further, the above-described FIG. 7 shows an example of a central part (from the 497th pixel to the 528th pixel) in horizontal scanning data in the image of FIG. 9.

Regarding the data output from the gamma correction circuit 612, the bit-data comparator 631 of the comparator 630 performs a comparison between previous and subsequent data input in the DAC0 (FIG. 2B) by bit. The data comparison is made by, for example, comparing the DATA (1984) input into the DAC0 at the HCLK timing (63) denoted by numeral 800 in FIG. 8 with the DATA (2016) input into the DAC0 at the HCLK timing (64) denoted by numeral 801 in FIG. 8, by bit. In this example, the comparison is made between the values (011111000000) and (011111100000) by bit. Accordingly, the result of differential comparison by bit is (00000100000), and the result of bit differential calculation is "1".

Further, the DATA (1988) input into the DAC1 next and the DATA (2020) input into the DAC1 at the next HCLK timing are compared by bit. In this example, the comparison is made between values (011111000100) and (011111100100) by bit. The result of differential comparison is (00000100000). Accordingly, the result of bit differential calculation is "1" as in the case of the DAC0. Hereinbelow, similarly, comparisons are made between DATA (1992 and 2028) input into the DAC2, DATA (1996 and 2012) input into the DAC3, and DATA (2012 and 2044) input into the DAC7 by bit. As a result, as shown in FIG. 8, the result of differential calculation is "1", and normal data output with small difference is obtained.

Next, the DATA (2016) input into the DAC0 at the HCLK timing (64) denoted by numeral 801 and DATA (2048) input into the DAC0 at the HCLK timing (65) denoted by numeral 802 are compared by bit. In this example, the comparison is made between values "2016 (011111100000)" and "2048 (100000000000)". The result of differential comparison by bit is (111111100000). Accordingly, the result of bit differential calculation is "7".

Further, the DATA (2020) input in the next DAC1 and DATA (2052) input in the DAC1 at the next HCLK timing are compared by bit. In this example, the comparison is made between values (011111100100) and (100000000100) by bit. As in the case of the DAC0, the differential value at this time is (111111100000), and the result of bit differential calculation is "7". Hereinbelow, similarly, comparisons are made between DATA (2024 and 2056) input into the DAC2, between DATA (2028 and 2060) input into the DAC3, and further, between DATA (2044 and 2076) input into the DAC7 by bit. As a result, as shown in FIG. 8, the results of the respective differential calculations are "7". It is understood that the difference is increased.

The bit-data comparator 631 determines whether or not the result of bit differential calculation is greater than a predetermined value. Assuming that the predetermined value (threshold value) is "6", the result of bit differential calculation between the HCLK timings (64) and (65) is "7" greater than the predetermined value. Accordingly, the bit-data comparator 631 outputs the signal 661 indicating that the result of bit differential calculation is greater than the predetermined value to the twice-write timing output unit 634.

Further, the differential data comparator 632 obtains a difference between the DATA (1984) input into the DAC0 at the HCLK timing (63) and the DATA (2016) input into the DAC0 at the next HCLK timing as in the case of the bit-data comparator 631. The difference between the DATA (1984:2016) is "020HEX". It is determined whether or not the difference is greater than a predetermined value. When the difference is greater than the predetermined value, it is determined that the influence which appears in an image upon occurrence of noise is little, and normal data output is performed. On the other hand, when the data difference is less than the predetermined value, as the luminance difference between adjacent parts of the image is small, a line image easily occurs due to the influence of variation (noise). The predetermined value (threshold value) of data difference may be "080HEX". Accordingly, in the case of the difference between the DATA (1984:2016) denoted by numerals 800 and 801, the differential data comparator 632 outputs the signal 662 indicating that the differential data is less than the predetermined value to the twice-write timing output unit 634.

The twice-write timing output unit 634 inputs these signals 661 and 662, then outputs an instruction to change the drive output timing signal for the liquid crystal display panel 100 to the timing generator 615, and further, outputs an instruction to change the drive output timing signal to the output data modification circuit 633. That is, if the bit-data comparator 631 determines that the difference by bit is large, or if the differential data comparator 632 determines that the differential data is small, these change instructions are output. The timing generator 615 and the output data modification circuit 633 receive the instructions to change the drive output timing signals, change the data signal (DADATA) and the panel drive signals to the liquid crystal display panel 100.

Figure 10:
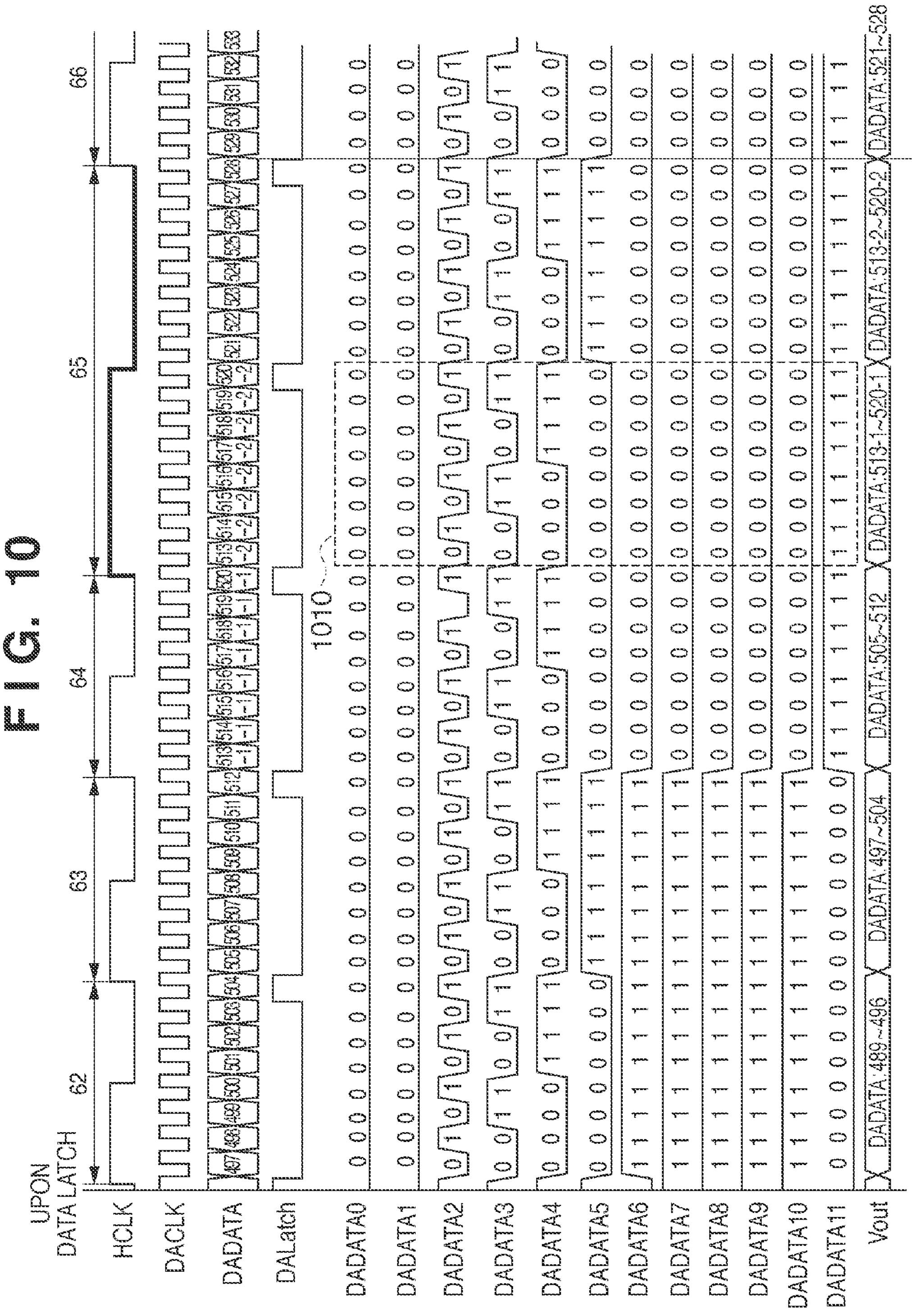
FIG. 10 is a timing chart of data subjected to timing change according to the first embodiment.

FIG. 10 is a timing chart of output data subjected to the timing change. Note that in FIG. 10, the value of the DADATA indicates the order of data supplied to the liquid crystal display panel 100.

The HCLK signal is a horizontal clock input into the H shift register 110 of the liquid crystal display panel 100 for horizontal scanning. The data DADATA is transferred to the D/A converter 531 at the rising edge of the DACLK signal. Then the data input into the registers (1stREG0 to 1stREG7) of the D/A converter 531 are latched in the registers (2nd REG0 to 2nd REG7) at the falling edge of the DALatch signal. That is, the data transferred in synchronization with the DACLK signal is reflected in the output from the D/A converter 531 at the falling edge of the DALatch next to the transfer. As the difference between the DATA (1984 to 2012) corresponding to the 63th HCLK and that between the DATA (2016 to 2044) corresponding to the 64th HCLK in FIG. 8 are all "1", there is no change in the HCLK timing (64) and the DATA (1984 to 2012).

Next, the difference between the DATA (2016 to 2044) corresponding to the 64th HCLK and the DATA (2048 to 2076) corresponding to the 65th HCLK in FIG. 8 is all "7". That is, in this case, it is determined that the bit difference from the bit-data comparator 631 is greater than the predetermined value (6), and the signal 661 is supplied to the twice-write timing output unit 634. Then the timing generator 615 outputs the DACLK at the HCLK timing (64) again (the number of clocks to the next HCLK timing (65) is double) as in the part 1010 surrounded with a dot line in FIG. 10. Further, the output data modification circuit 633 again transfers the data input at the HCLK timing (64) as in the case of the part 1010 in FIG. 10. That is, the period of the HCLK timing (64) is doubled, and the same data is output twice, thereby the writing time of the image data into the liquid crystal display panel 100 is doubled in comparison with normal image writing time. In this manner, the twice continuous output of the same data reduces the influence of noise due to the data difference by bit upon transfer from the 1stREG to the 2nd REG (upon DALatch). In the status where the noise due to image data is lowered, the image data can be written.

In this manner, when the bit-data comparator 631 determines that the bit difference is greater than the predetermined value and when the differential data comparator 632 determines that the data difference is less than the predetermined value, the operation to double the number of clocks of the DACLK in the one cycle of HCLK and transfer the same data twice is repeated. The entire image region is scanned in this manner, thereby an excellent image with reduced noise due to image data can be displayed.

According to the present embodiment as described above, in a region with high probability of occurrence of noise, the occurrence of noise can be suppressed by changing the image signal output timing and the image signal.

Next, a second embodiment of the present invention will be described. The operation of the comparator 630 according to the second embodiment will be described with reference to the timing chart of FIG. 11 and FIG. 12. Note that as the configuration of the display apparatus 1000 and the configuration of the liquid crystal display panel 100 according to the second embodiment are basically the same as those in the above-described first embodiment, explanations of the configurations will be omitted.

In the above-described first embodiment, the data input in the DAC is compared with the data input in the DAC shifted by one cycle of HCLK. In the second embodiment, the difference from the first embodiment is that a difference is obtained between pixel data continuously arrayed in the horizontal direction in synchronization with the DACLK signal, and the twice-write timing output unit 634 operates in correspondence with the difference.

Figure 11:
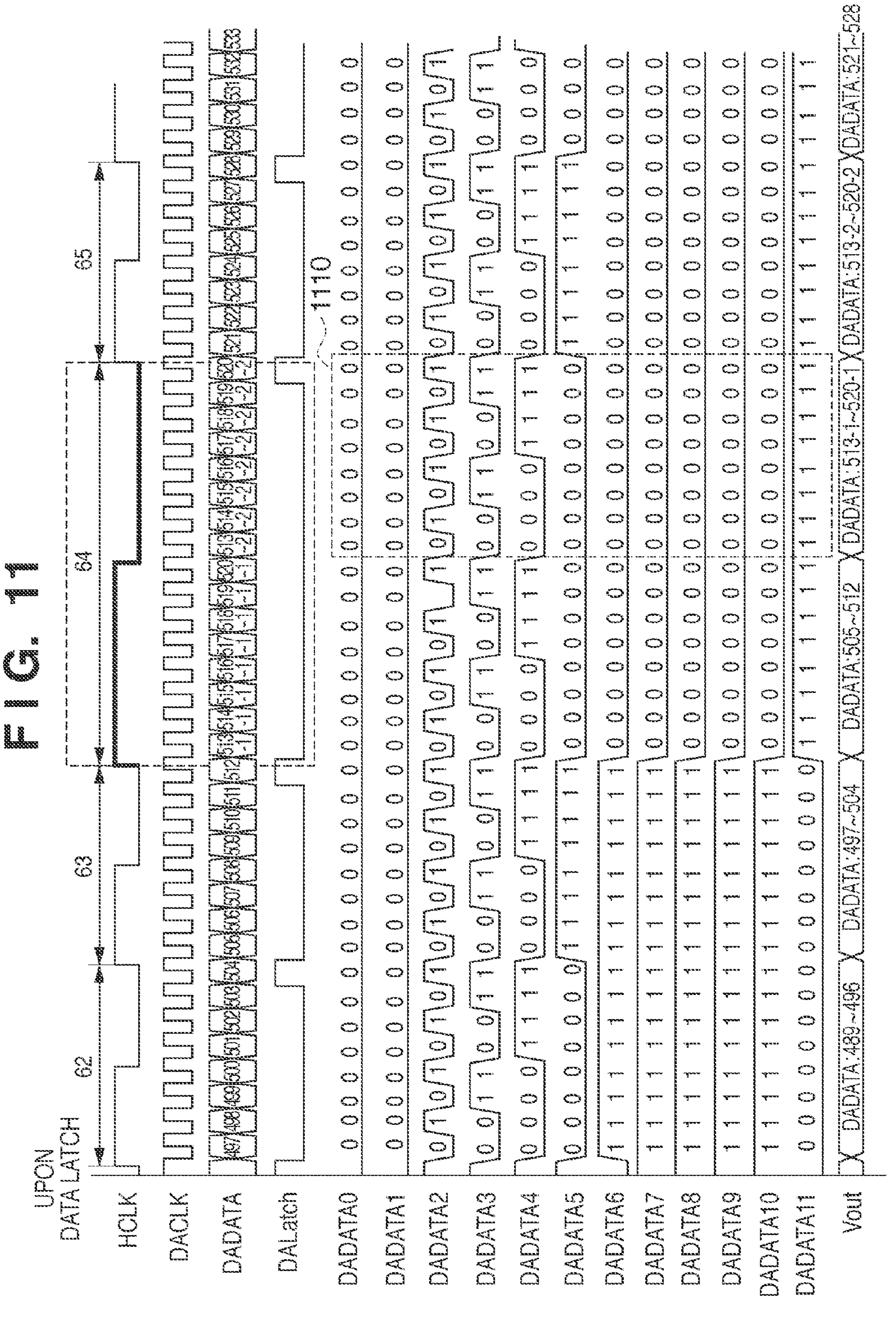
FIG. 11 is a timing chart explaining a second embodiment of the present invention.

First, signals in the timing chart of FIG. 11 will be described. In FIG. 11, the signals CLK and DADATA0 to DADATA7 are the same as those described in FIG. 10. In this embodiment, it is presumed that the Vout signals from the D/A converter 531 are output for 8 channels. Accordingly, when the DADATA for 8 clocks is transferred, then, as in the case of the DALatch signal, the latch signal (Latch) is output.

FIG. 12 depicts a view illustrating an example of bit-based differences according to the second embodiment.

In FIG. 12, the DATA denoted by numeral 1200 indicates the order of input of the horizontal scanning data in the liquid crystal display panel 100. The HCLK signal indicates the number of clocks from the start of data writing in the horizontal direction of the liquid crystal display panel 100. As the D/A converter 531 outputs signals for 8 channels, the HCLK signal is increased by 1 clock by 8 DADATA. "DAC" indicates respective channel outputs Vout0 to Vout7 in the DAC0 to DAC7 of the D/A converter 531. The DATA denoted by numeral 1201 indicates a decimal number and a hexadecimal number of actual image data. "Binary data" indicates a binary number of the actual image data. "Differential comparison" indicates, for example, in FIG. 12, numeral 1204 denotes a comparison of difference by bit between the DATA (1984) and the DATA (1988). The binary number of the DATA (1984) is (011111000000) and that of the DATA (1988) is (011111000100). In these binary numbers, the difference of numbers when each bit is "1" is obtained. In the comparison between the DATA (1984) (011111000000) and the DATA (1988) (011111000100), only the 3rd bits are different. Accordingly, the result of differential calculation is "1". The result of differential calculation is indicated in the differential calculation of the DATA (1984) denoted by numeral 1204.

As in the case of the above-described first embodiment, the second embodiment can be easily explained with a lamp pattern as shown in FIG. 9, this pattern data is used.

FIG. 11 is a timing chart showing the timing of data input in a part (central part) of data in the H scanning.

As the flow of DATA, in the data output from the gamma correction circuit 612 shown in FIG. 6A, the bit-data comparator 631 of the comparator 630 performs a comparison by each bit of the sequentially input DADATA. The data comparison is made between, for example, the DATA (1984) first input at the HCLK timing (63) denoted by numeral 1204 in FIG. 12 and the DATA (1988) input at the next DACLK timing by bit. In this example, the comparison is made between values (011111000000) and (011111000100) by bit. The result of differential comparison is (00000000100), and the result of bit differential calculation is "1" (FIG. 12). Further, a comparison is made between the next input DATA (1988) and the DATA (1992) input at the next DACLK timing by bit. In this case, the comparison is made between values (011111000100) and (0111110001000) by bit. The result of differential comparison by bit is (0000001100). Accordingly, the result of bit differential calculation is "2". Hereinbelow, similarly, comparisons are made between the DATA (1992:1996), between the DATA (1996:2000), between the DATA (2000:2004) in the order of DATA input by bit. As a result, as shown in the differential calculation in FIG. 12, the results of differential calculation are "1" to "3", and as the differences are less than the predetermined value (for example, 6), normal data output is performed.

Next, the DATA (2044) finally input at the HCLK timing (64) denoted by numeral 1202 and the DATA (2048) first input at the next HCLK timing (65) denoted by numeral 1203 are compared by bit. In this example, the comparison is made between values (011111111100) and (100000000000) by bit. The result of differential comparison in this case is (111111111100), and the result of bit differential calculation is "10". The bit-data comparator 631 determines whether or not the result of bit differential calculation is greater than the predetermined value. Assuming that the predetermined value (threshold value) is "6", in the comparison between the DATA (2044:2048), the result of bit differential calculation is "10" greater than the predetermined value. The bit-data comparator 631 supplies the signal 661 indicating that the difference by bit is large to the twice-write timing output unit 634.

Next, the differential data comparator 632 obtains a difference between the DATA (1984) input into the DAC0 at the HCLK timing (63) and the DATA (2016) input into the DAC0 at the next HCLK timing (64). In this example, the difference is obtained by (011111100000)-(011111000000). Accordingly, the data difference is "020HEX". It is determined whether or not the data difference is greater than the predetermined value in the data within one cycle of HCLK (for example, the DATA (1984 to 2012) at HCLK timing (63)). If the data difference is greater than the predetermined value, even if noise occurs, as the noise is not conspicuous in the image, normal data output is performed. On the other hand, if the data difference is less than the predetermined value, there is a high probability that a line image appears due to the influence of the variation (noise). When the data difference predetermined value (threshold value) is "080HEX", as the data difference "020HEX" is less than the predetermined value, the signal 662 is supplied to the twice-write timing output unit 634. The twice-write timing output unit 634 inputs the signals 661 and 662 from the respective circuits, and outputs instruction signals to change drive output timing signals to the timing generator 615 and the output data modification circuit 633. The timing generator 615 and the output data modification circuit 633 input the change instruction signals, and change the data signal to the D/A converter 531 and the panel drive signal to the liquid crystal display panel 100.

FIG. 11 shows an example where the timing change is performed in the second embodiment. Note that FIG. 11 is basically the same as the case of FIG. 10 in the above-described first embodiment.

In FIG. 12, the result of bit differential value calculation between the DATA (2044) denoted by numeral 1202 and the DATA (2048) denoted by numeral 1203 is "10". Accordingly, the signal 661 is input from the bit-data comparator 631 into the twice-write timing output unit 634. The timing generator 615 doubles the number of clocks of the DACLK signal during the HCLK timing (64) (doubles the number of clocks (DACLK) to the next HCLK timing (65)) as in a part 1110 surrounded with a dot line in FIG. 11. Further, the output data modification circuit 633 transfers the data input during the HCLK timing (64) twice as in the part 1110 in FIG. 11. That is, the period of the HCLK timing (64) is doubled, and the DALatch signal is not generated after the DATA denoted by numerals (513-1 to 520-1). In this manner, the period of the HCLK timing (64) is prolonged, and the same data is continuously supplied to the liquid crystal display panel 100 twice.

Thus, image data writing can be performed while reducing the influence of noise due to data difference by bit between adjacent data. Then, when the difference by bit is greater than the predetermined value in the comparison by the bit-data comparator 631 and when the data difference is less than the predetermined value in the comparison by the differential data comparator 632, the operation to double the number of clocks of the DACLK generated in 1 HCLK and transfer the data twice is repeated. The entire image region is scanned in this manner, thereby an excellent image can be displayed.

Note that in the timing chart of FIG. 11, in the latter half of the HCLK timing (64), the same data (513-2 to 520-2) as the first half data (513-1 to 520-1) is output. However, the present invention is not limited to this arrangement, but it may be arranged such that the output of the DACLK is stopped in the last half of the HCLK timing (64) and the output of image data is stopped.

Next, a third embodiment of the present invention will be described. In the third embodiment, as the difference from the first embodiment is only the configuration of the comparator 630 and the other constituent elements are the same as those in the first embodiment, explanations of those constituent elements will be omitted.

Figure 13:
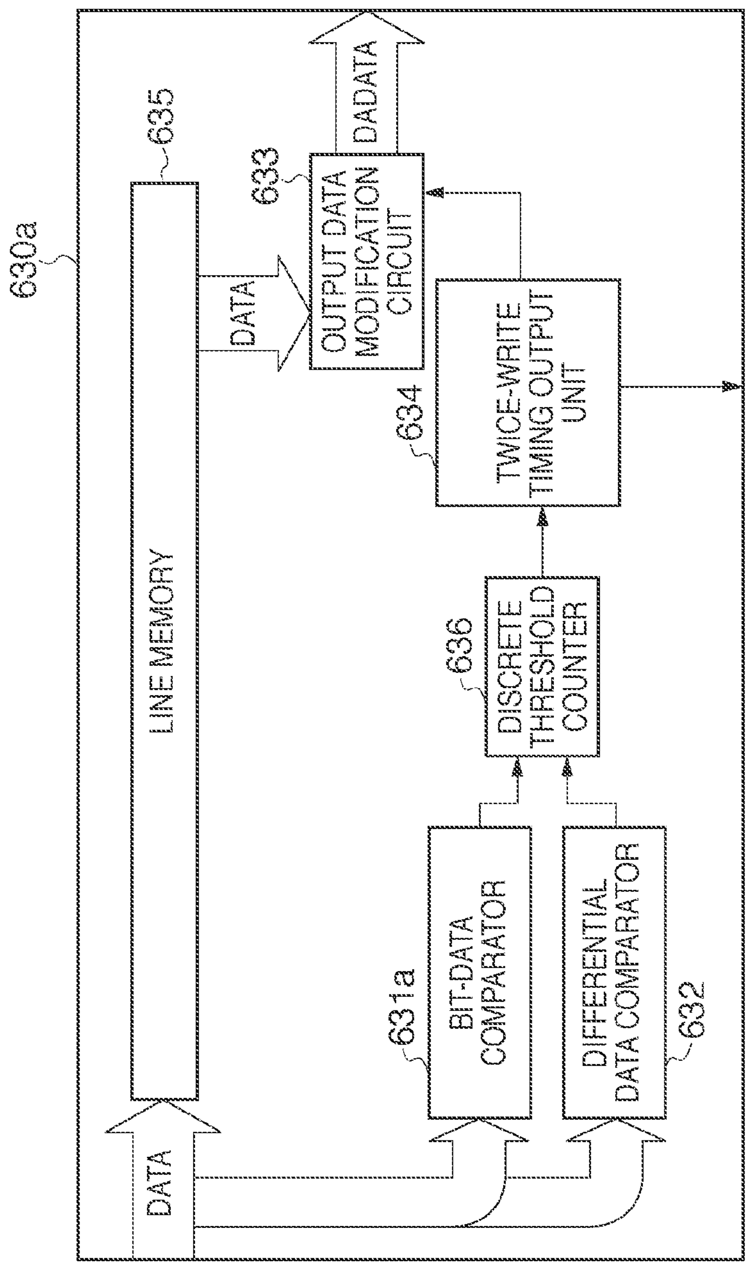
FIG. 13 is a block diagram showing a configuration of the comparator according to a third embodiment of the present invention.

FIG. 13 is a block diagram showing a configuration of a comparator 630*a* according to third third embodiment. Note that elements corresponding to those in the comparator 630 according to the above-described first embodiment have the same reference numerals and explanations thereof will be omitted.

The comparator 630*a* writes data for 1 horizontal scanning into a line memory 635. The differential data comparator 632 performs a comparison at timing of data writing into the line memory 635. In this example, assuming that the predetermined value (threshold value) is "080HEX", the result of comparison is output to a discrete threshold counter 636. Further, a bit-data comparator 631*a* has data comparators for plural threshold values.

Figure 14:
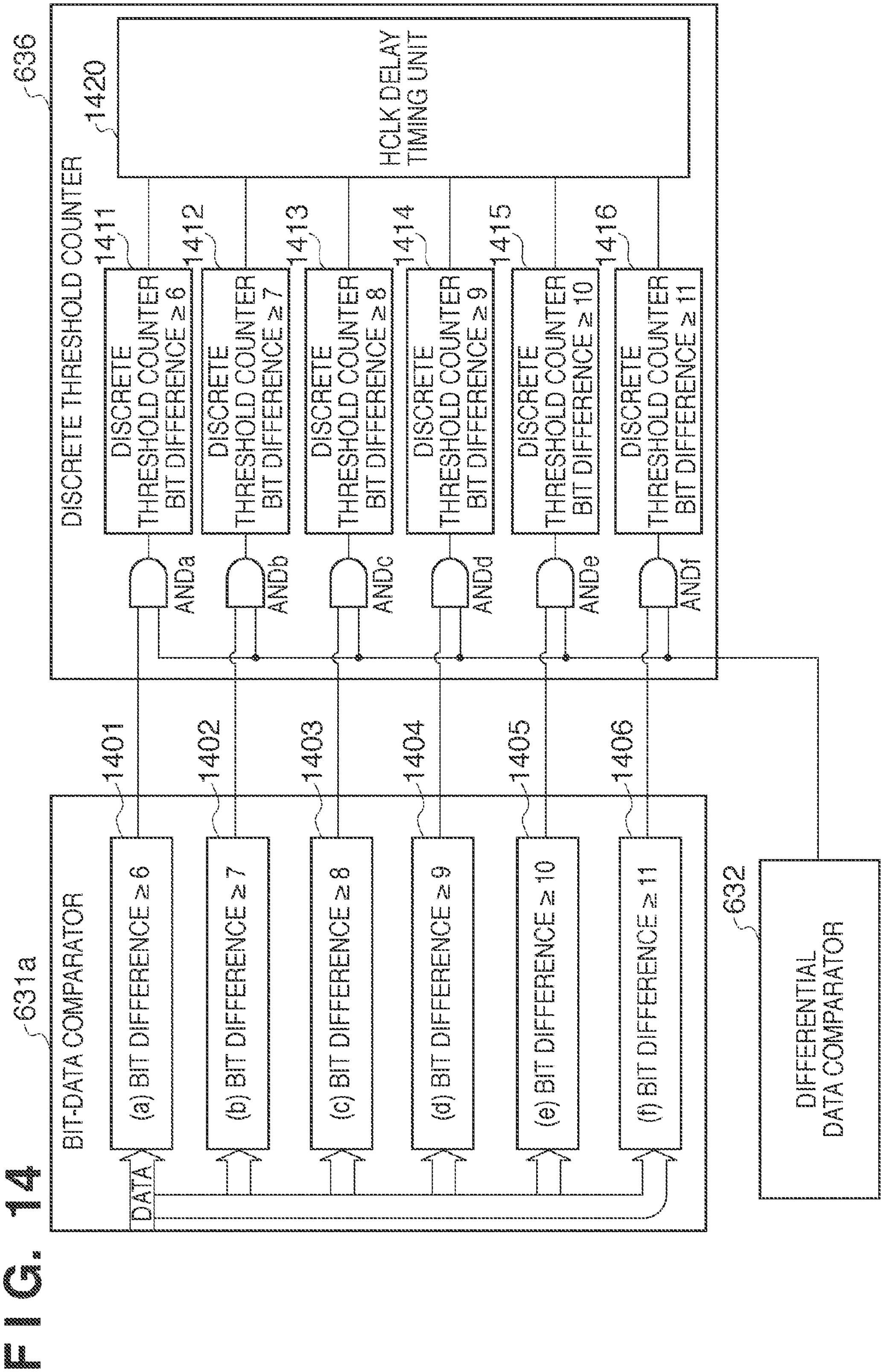
FIG. 14 is a block diagram showing a configuration of a bit-data comparator according to the third embodiment.

FIG. 14 is a block diagram showing a configuration of a bit-data comparator 631*a* according to the third embodiment.

Figure 15:
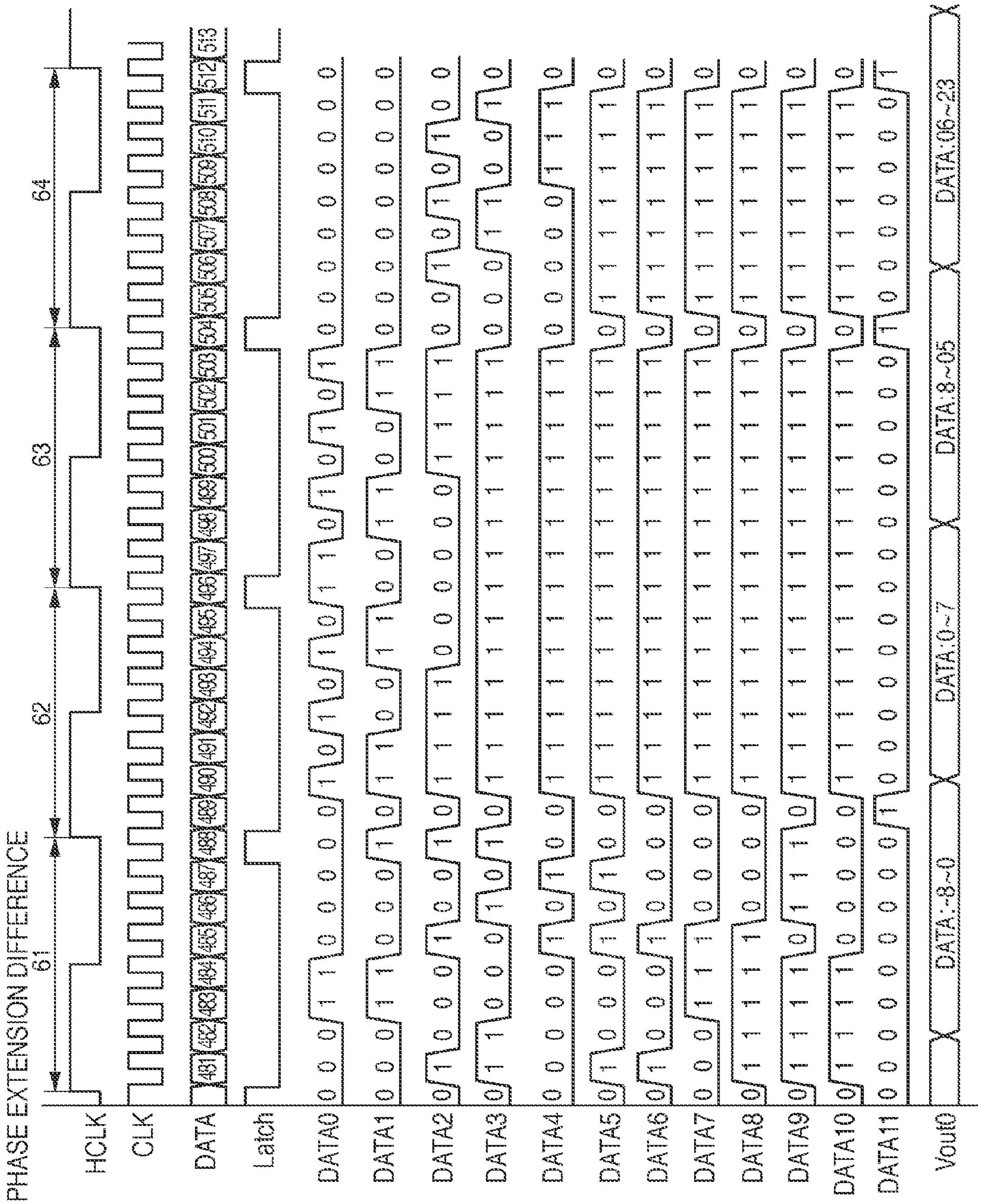
FIG. 15 is a timing chart explaining the third embodiment.

Numerals 1401 to 1404 denote comparators provided for respective threshold values. The results of comparison in the respective comparators indicate frequencies of occurrence of the number of different bits, and the results of comparison are input into the discrete threshold counter 636. For example, assuming that the data is as shown in the timing chart of FIG. 15 and FIGS. 16A and 16B, in the output from the differential data comparator 632, difference calculation is made between the data in the same channel (display image signals) in the DAC0 to DAC7 at the HCLK timing (61) and the data in the DAC0 to DAC7 at the HCLK timing (62). Assuming that the predetermined value (threshold value) is "080HEX", a difference between the data (1923) in the DAC2 at the HCLK timing (61) denoted by numeral 1603 and the data (2046) in the DAC2 at the HCLK timing (62) denoted by numeral 1600 is "07BHEX". Further, a difference between the data (1923) in the DAC3 at the HCLK timing (61) denoted by numeral 1604 and the data (2045) in the DAC3 at the HCLK timing (62) denoted by numeral 1601 is "07AHEX". These values are indicated as a DATA differential calculation values for the lines denoted by numerals 1600 and 1601. Thus, in the subsequent lines, a differential value by channel is similarly obtained. As a result, the differential value in the DAC0 at the HCLK timing (62) and in the DAC0 at the HCLK timing (63) denoted by numeral 1605 and the subsequent values are all less than the predetermined value. These values are represented by attaching a circle in the fields of DATA differential calculation in FIGS. 16A and 16B.

Further, the bit-data comparator 631*a* obtains a data difference by bit between the data (1923) in the DAC2 at the HCLK timing (61) denoted by numeral 1603 and the data (2046) in the DAC2 at the HCLK timing (62) denoted by numeral 1600. The comparators 1401 to 1406 output bit differential values based on the respective threshold values. In FIGS. 16A and 16B, the results of differential calculation (a) to (d) indicate the outputs from the respective comparators 1401 to 1404 in FIG. 14. The output of bit difference≥6 (1401) is output in the lines (489, 490, 492, 494, 495, 496, 497 and 504) on the subsequent side upon calculation time. The output of bit difference≥7 (1402) is output in the lines (489, 494, 496, 497 and 504) on the subsequent side upon calculation time. The output of bit difference≥8 (1403) is output in the lines (489,

496, 497 and 504) on the subsequent side upon calculation time. The output of bit difference≥9 (1404) is output in the lines (497 and 504) on the subsequent side upon calculation time. The respective outputs from the bit-data comparator 631*a* and the differential data comparator 632 are input into the discrete threshold counter 636. The outputs from the comparators 1401 to 1406 are respectively subjected to AND operation with the outputs indicating the results of determination by the differential data comparator 632, in ANDa to ANDf circuits. The outputs from the ANDa to ANDf circuits are respectively input and counted in corresponding counters 1411 to 1416. An HCLK delay timing unit 1420 holds the respective HCLK timings and count values upon occurrence.

In the example of FIGS. 16A and 16B, the results of comparison in a line (492) denoted by numeral 1601 (HCLK: 62), a line (497) denoted by numeral 1605 (HCLK: 63) and a line (504) (HCLK: 63) are input into the discrete threshold counter 1411. Further, the results of comparison in a line (497) (HCLK: 63) and a line (504) (HCLK: 63) are input into the discrete threshold counters 1412 to 1414. At this time, the count value of the discrete threshold counter 1411 is "3", and the timing change of the panel drive signal at this time (twice-write timing) is 2HCLK. Further, the count values of the discrete threshold counters 1412 to 1414 are "2" and the timing change of the panel drive signal is 1HCLK.

Then, a result of comparison based on the threshold value within a clock including horizontal blankings (for example. 15 HCLK) in the HCLK (1H:128 HCLK) for 1 H scanning (1024 pixels) is selected. For example, in the example of FIGS. 16A and 16B, when the twice-write timing is 18 HCLK for the entire 1 H scanning in the case of the discrete threshold counter 1411 and when the twice-write timing is 14 HCLK for the entire 1 H scanning in the case of the discrete threshold counter 1412, the discrete threshold counter 1412 is selected. The twice-write timing output unit 634 inputs the count value selected in the discrete threshold counter 636, and outputs the timing change signal to the output data modification circuit 633. The output data modification circuit 633 reads data subjected to comparison by the bit-data comparator 631*a* and the differential data comparator 632 from the line memory 635, and outputs the read data as normal data, otherwise, outputs twice-written data. Further, the output data modification circuit 633 outputs the timing change signal for the liquid crystal drive timing to the timing generator 615.

In the above structure, it is possible to set twice-write timing within blanking of the horizontal scanning. Further, it is possible to increase the twice-write timing within one horizontal scanning to a condition on which noise can be reduced as much as possible.

As described above, according to the present embodiment, upon occurrence of DAC noise, image data write timing is delayed to timing where the DAC output becomes stabilized, thereby the occurrence of noise can be suppressed. This reduces degradation of image due to noise (vertical line in a gradation image).

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-284546, filed Dec. 15, 2009, which is hereby incorporated by reference herein in its entirety.

What is claimed is:

1. A display control apparatus for driving a display panel to display an image, comprising:

a generation unit configured to generate a display image signal having a plurality of bits based on an input image signal;

a converter configured to time-divisionally convert the display image signal into an analog signal;

a clock generator configured to generate a synchronizing clock of the display image signal;

a driving unit configured to drive the display panel in synchronization with the synchronizing clock to display an image based on the analog signal converted by the converter;

a determination unit configured to determine whether or not a number of different bits in the plurality of bits of the display image signals that are to be continuously converted by the converter are different from each other is equal to or more than a predetermined value; and a controller configured to control the generation unit to modify the display image signal and prolong the cycle of the synchronizing clock if the determination unit determines that the number of different bits is equal to or more than the predetermined value.

2. The display control apparatus according to claim 1, wherein the controller controls the generation unit to repeatedly output to the converter the later display image signal of the display image signals that are to be continuously converted by the converter if the determination unit determines that the number of different bits is equal to or more than the predetermined value.

3. The display control apparatus according to claim 1, wherein the generation unit generates the display image signal by dividing the input image signal in a horizontal direction into a plurality of channels, the converter converts the display image signals of the plurality of channels into analog signals in parallel, the determination unit determines whether or not the number of different bits in the display image signals in each channel that are to be continuously converted by the converter are different from each other is equal to or more than the predetermined value, and the controller controls the generation unit to repeatedly output to the converter the later display image signal of the display image signals in a channel that are to be continuously converted by the converter if the determination unit determines that the number of different bits in the channel is equal to or more than the predetermined value.

4. The display control apparatus according to claim 1, wherein the controller controls the generation unit to repeatedly output to the converter the display image signal that is determined by the determination unit to have the number of different bits being equal to or more than the predetermined value, among a display image signal corresponding to one frame of the input image signal.

5. The display control apparatus according to claim 1, wherein the controller controls the clock generator to double the cycle of the synchronizing clock if the determination unit determines that the number of different bits in the channel is equal to or more than the predetermined value.

6. A display control method of driving a display panel to display an image, comprising:

generating a display image signal having a plurality of bits based on an input image signal;

time-divisionally converting the display image signal into an analog signal;

generating a synchronizing clock of the display image signal;

driving the display panel in synchronization with the synchronizing clock based on the analog signal converted in the converting step to display an image;

determining whether or not a number of different bits in the plurality of bits of the display image signals that are to be continuously converted in the converting step are different from each other is equal to or more than a predetermined value; and controlling the generating step to modify the display image signal and prolong the cycle of the synchronizing clock if it is determined in the determining step that the number of different bits is equal to or more than the predetermined value.

7. A display control apparatus for driving a display panel to display an image, comprising:

a generation unit configured to generate a display image signal having a plurality of bits based on an input image signal;

a converter configured to convert the display image signal into an analog signal;

a clock generator configured to generate a synchronizing clock of the display image signal;

a driving unit configured to drive the display panel in synchronization with the synchronizing clock to display an image based on the analog signal converted by the converter;

a determination unit configured to determine whether or not a number of different bits in the plurality of bits of the display image signals corresponding to adjacent pixels in a scanning direction of the input image signal are different from each other is equal to or more than a predetermined value; and a controller configured to control the generation unit to modify the display image signal and prolong the cycle of the synchronizing clock if the determination unit determines that the number of different bits is equal to or more than the predetermined value.

8. The display control apparatus according to claim 7, wherein the controller controls the generation unit to repeatedly output a display image signal corresponding to the later pixel in the scanning direction of the adjacent pixels if the determination unit determines that the number of different bits is equal to or more than the predetermined value.

9. The display control apparatus according to claim 7, wherein the converter time-divisionally converts the display image signal into analog signals in parallel, the determination unit further determines whether or not the number of different bits in the plurality of bits of the display image signals that are to be continuously converted by the converter are different from each other is equal to or more than a threshold, and the controller controls the generation unit to modify the display image signal if the determination unit determines that the number of different bits in the plurality of bits of the display image signals that are to be continuously converted by the converter is less than the threshold, and controls the generation unit not to modify the display image signal if the determination unit determines that the number of different bits is equal or more than the threshold.

10. The display control apparatus according to claim 7, wherein the controller controls the clock generator to double the cycle of the synchronizing clock if the determination unit determines that the number of different bits in the channel is equal to or more than the predetermined value.

11. A display control method of driving a display panel to display an image, comprising:

generating a display image signal having a plurality of bits based on an input image signal;

converting the display image signal into an analog signal;

generating a synchronizing clock of the display image signal;

driving the display panel in synchronization with the synchronizing clock based on the analog signal converted in the converting step to display an image;

determining whether or not a number of different bits in the plurality of bits of the display image signals corresponding to adjacent pixels in a scanning direction of the input image signal are different from each other is equal to or more than a predetermined value; and controlling the generation step to modify the display image signal and prolong the cycle of the synchronizing clock if it is determined in the determining step that that the number of different bits is equal to or more than the predetermined value.

* * * * *